(12) United States Patent
Tamura

(10) Patent No.: US 6,760,718 B2
(45) Date of Patent: Jul. 6, 2004

(54) DATABASE OPERATION PROCESSOR

(75) Inventor: Takayuki Tamura, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 245 days.

(21) Appl. No.: 09/898,042

(22) Filed: Jul. 5, 2001

(65) Prior Publication Data

US 2002/0059191 A1 May 16, 2002

(30) Foreign Application Priority Data

Jul. 7, 2000 (JP) ........................................ 2000-206345

(51) Int. Cl.[7] .............................................. G06F 17/30
(52) U.S. Cl. .............................. 707/2; 707/6; 707/101
(58) Field of Search .................... 707/1–10, 100–104.1, 707/200–206

(56) References Cited

U.S. PATENT DOCUMENTS 5,864,842 A * 1/1999 Pederson et al. ............... 707/3
6,226,634 B1    5/2001 Ogihara et al.
6,397,204 B1 * 5/2002 Liu et al. ....................... 707/2

OTHER PUBLICATIONS

R. Agrawal et al., "Fast Algorithms for Mining Association Rules," In proceedings of the 20th VLDB (Very Large Data Bases) Conference, 1994, pp. 487–499.
"An Introduction to Database Systems," C.J. Date, 6th edition, Chapter 18, Addison–Wesley,1995.

* cited by examiner

Primary Examiner—Shahid Alam
Assistant Examiner—Jean Bolte Fleurantin
(74) Attorney, Agent, or Firm—Leydig, Voit & Mayer, Ltd.

(57) ABSTRACT

A database operation processor includes a self-join detector for detecting if a self-join operation is included in a query statement for a table in a database and generating a self-join operation expression, a join key classifier for classifying a join key included in a join condition in the operation expression into an equi-join key or a non equi-join key based on the generated self-join operation expression, and a self-join operation executor for sorting records stored in the table by the equi-join key, inputting in the sorted table, executing the generated self-join operation expression, and producing a result for the query statement.

19 Claims, 30 Drawing Sheets

Fig. 4

SCAN OPERATION DESCRIPTOR
4-1

| OPERATOR IDENTIFIER | #1 |
|---|---|
| KIND OF OPERATION | SCAN |
| ATTRIBUTE OF 1ST RESULT COLUMN | NAME=ID, DATA TYPE=INTEGER, ... |
| ATTRIBUTE OF 2ND RESULT COLUMN | NAME=ITEM, DATA TYPE=CHARACTER, STRING, ... |
| — | — |
| ATTRIBUTE OF N-TH RESULT COLUMN | NAME= , DATA TYPE= , ... |
| TABLE NAME | SALES |

Fig. 5

SELECT OPERATION DESCRIPTOR 5-1

| OPERATOR IDENTIFIER | #2 |
|---|---|
| KIND OF OPERATION | SELECT |
| ATTRIBUTE OF 1ST RESULT COLUMN | NAME=ID, DATA TYPE=INTEGER, ... |
| ATTRIBUTE OF 2ND RESULT COLUMN | NAME=ITEM, DATA TYPE=CHARACTER, STRING, ... |
| — | — |
| ATTRIBUTE OF N-TH RESULT COLUMN | NAME= , DATA TYPE= , ... |
| INPUT OPERATION DESCRIPTOR | #1 |
| SELECT CONDITION | ID > 100 |

Fig. 6

JOIN OPERATION DESCRIPTOR
6-1

| OPERATOR IDENTIFIER | #4 |
|---|---|
| KIND OF OPERATION | JOIN |
| ATTRIBUTE OF 1ST RESULT COLUMN | NAME=ID, DATA TYPE=INTEGER, ... |
| ATTRIBUTE OF 2ND RESULT COLUMN | NAME=ITEM, DATA TYPE=CHARACTER, STRING, ... |
| — | — |
| ATTRIBUTE OF N-TH RESULT COLUMN | NAME= , DATA TYPE= , ... |
| 1ST INPUT OPERATION DESCRIPTOR | #2 |
| 2ND INPUT OPERATION DESCRIPTOR | #3 |
| JOIN CONDITION | INPUT1.ID=INPUT2.ID |

Fig. 7

SELF-JOIN OPERATION DESCRIPTOR
7-1

| | |
|---|---|
| OPERATOR IDENTIFIER | #5 |
| KIND OF OPERATION | SELFJOIN |
| ATTRIBUTE OF 1ST RESULT COLUMN | NAME=ID, DATA TYPE=INTEGER, ... |
| ATTRIBUTE OF 2ND RESULT COLUMN | NAME=ITEM, DATA TYPE=CHARACTER, STRING, ... |
| — | — |
| ATTRIBUTE OF N-TH RESULT COLUMN | NAME= , DATA TYPE= , ... |
| INPUT OPERATION DESCRIPTOR | #2 |
| MULTIPLEXING LEVEL | 2 |
| JOIN CONDITION | INPUT1.ID=INPUT2.ID |

Fig. 21

|  | ID | | ITEM | |
|---|---|---|---|---|
| RECORD 1 | 10 | | 122 | |
| RECORD 2 | 10 | | 111 | |
| RECORD 3 | 10 | | 123 | |
| RECORD 4 | 10 | | 124 | |
| RECORD 5 | 10 | | 111 | |
| RECORD 6 | 10 | | 125 | |

Fig. 22

(A) PROCESSING WHEN FIRST POINTER = RECORD 1

| PROCESSING NUMBER IN S20-3 | 1ST POINTER | 2ND POINTER | PRODUCE RESULT RECORD |
|---|---|---|---|
| 1 ST | RECORD 1 | RECORD 1 | NO |
| 2 ND | RECORD 1 | RECORD 2 | NO |
| ⋮ | ⋮ | ⋮ | ⋮ |
| 6 TH | RECORD 1 | RECORD 6 | YES |

(B) PROCESSING WHEN FIRST POINTER = RECORD 2

| PROCESSING NUMBER IN S20-3 | 1ST POINTER | 2ND POINTER | PRODUCE RESULT RECORD |
|---|---|---|---|
| 1 ST | RECORD 2 | RECORD 1 | YES |
| 2 ND | RECORD 2 | RECORD 2 | NO |
| ⋮ | ⋮ | ⋮ | ⋮ |
| 6 TH | RECORD 2 | RECORD 6 | YES |

(C) PROCESSING WHEN FIRST POINTER = RECORD 6

| PROCESSING NUMBER IN S20-3 | 1ST POINTER | 2ND POINTER | PRODUCE RESULT RECORD |
|---|---|---|---|
| 1 ST | RECORD 6 | RECORD 1 | NO |
| 2 ND | RECORD 6 | RECORD 2 | NO |
| ⋮ | ⋮ | ⋮ | ⋮ |
| 6 TH | RECORD 6 | RECORD 6 | NO |

Fig. 23

|  | ID | ITEM |
|---|---|---|
| RECORD 1 | 10 | 111 |
| RECORD 2 | 10 | 111 |
| RECORD 3 | 10 | 122 |
| RECORD 4 | 10 | 123 |
| RECORD 5 | 10 | 124 |
| RECORD 6 | 10 | 125 |

Fig. 24

(A) PROCESSING WHEN FIRST POINTER = RECORD 1

| PROCESSING NUMBER IN S20-3 | 1ST POINTER | 2ND POINTER | PRODUCE RESULT RECORD |
|---|---|---|---|
| 1 ST | RECORD 1 | RECORD 2 | NO |
| 2 ND | RECORD 1 | RECORD 3 | YES |
| ⋮ | ⋮ | ⋮ | ⋮ |
| 5TH | RECORD 1 | RECORD 6 | YES |

(B) PROCESSING WHEN FIRST POINTER = RECORD 2

| PROCESSING NUMBER IN S20-3 | 1ST POINTER | 2ND POINTER | PRODUCE RESULT RECORD |
|---|---|---|---|
| 1 ST | RECORD 2 | RECORD 3 | YES |
| 2 ND | RECORD 2 | RECORD 4 | YES |
| 3 RD | RECORD 2 | RECORD 5 | YES |
| 4 TH | RECORD 2 | RECORD 6 | YES |

(C) PROCESSING WHEN FIRST POINTER = RECORD 5

| PROCESSING NUMBER IN S20-3 | 1ST POINTER | 2ND POINTER | PRODUCE RESULT RECORD |
|---|---|---|---|
| 1 ST | RECORD 5 | RECORD 6 | YES |

Fig. 26

(A) SELF-JOIN EXPRESSION IN SQL STANDARD

```
SELECT A1.ID, A1.ITEM, A2.ITEM
FROM A A1, A A2
WHERE A1.ID = A2.ID
   AND A1.ITEM < A2.ITEM
```

(B) SPECIAL COMMENT INDICATING SELF-JOIN

```
SELECT A1.ID, A1.ITEM, A2.ITEM
FROM A A1, A A2
WHERE A1.ID = A2.ID --# selfjoin_key
   AND A1.ITEM < A2.ITEM
```
SPECIAL COMMENT (C) LOAD A KEYWORD INDICATING SELF-JOIN

```
SELECT A1.ID, A1.ITEM, A2.ITEM
FROM A A1 SELF JOIN A A2
USING A1.ID = A2.ID
   AND A1.ITEM < A2.ITEM
```

Fig. 30
RELATED ART

SELF-JOIN QUERY FOR DERIVING 2- ITEM SET

```
select s_1.item, s_2.item
  from SALES s_1, SALES s_2
 where s_1.trans_id = s_2.trans_id
   and s_1.item < s_2.item
```

SELF-JOIN QUERY FOR DERIVING 3- ITEM SET

```
select s_1.item, s_2.item, s_3.item
  from SALES s_1, SALES s_2, SALES s_3
 where s_1.trans_id = s_2.trans_id
   and s_2.trans_id = s_3.trans_id
   and s_1.item < s_2.item
   and s_2.item < s_3.item
```

DATABASE OPERATION PROCESSOR

BACKGROUND OF THE INVENTION

1. Field of the Invention

This invention relates to a (relational) database system. Firstly, this invention relates to self-join operation processing for extracting a record satisfying a condition specified in a query from a plurality of records in a same table. Secondly, this invention relates to data mining for finding a relation among data stored in a database by the self-join operation.

2. Description of the Related Art

As a processing method of a join operation in the relational database system, "Nest Loop Processing Method," "Sort Merge Processing Method," "Hash Processing Method," etc. are known.

In the "Nest Loop Processing Method," while each part of records in a table is stored in a buffer in a memory, all records in another table are read. Then, an output record is produced by combining records which satisfy a join condition.

Since one of the tables is read repeatedly, the "Nest Loop Processing Method" is not efficient. If it is possible to read only records satisfying the join condition by using an index, efficiency of the "Nest Loop Processing Method" can be improved.

The "Nest Loop Processing Method" can be applied to any join condition. However, most of the join operations are equi-join operations with a join condition of equal key values. For the equi-join operations, the processing can become efficient by restricting a retrieval range of the join records by using the "Sort Merge Processing method" and "Hash Processing Method."

In the "Sort Merge Processing Method," record groups in both of the tables are sorted by a join key at first. Accordingly, it becomes possible to access records with an equal key value continuously. Further, a changing point of the key value is found and identified as a retrieval range boundary.

In the "Hash Processing Method," the record groups in both of the tables are classified into a plurality of groups according to a value obtained by applying a hash function to the join key, and the processing are divided into join operations between corresponding groups. There is a possibility that there are records with various join key values in each of the groups, however the possibility can be reduced by increasing a number of the groups. Operations of the hash function is simpler than sorting. Therefore, the "Hash Processing Method" has an advantage when the performance of the CPU (Central Processing Unit) is limited.

In the "Sort Merge Processing Method" and "Hash Processing Method," an input table is preprocessed, and a processing result is written in a storing unit as intermediate data. Therefore, in self-join processing where two input tables are same and join keys are same, two intermediate data with a same content are produced physically.

Accordingly, a load of processing in the self-join operation in a same table is as heavy as a load of processing in the join operation between different tables.

An association rule mining (basket analysis) is a kind of data mining, i.e., analyzing mass data statistically and finding useful rules and knowledge. The association rule mining is utilized for increasing sales through a merchandise display in a store, set sales, etc. by finding a trend in combinations of purchased items from a consumer purchase behavior history.

The association rule mining includes a phase of extracting all combinations of items (frequent itemset), which appear a determined number of times or more, from purchase history data stored in the database system and a phase of finding an association rule by considering inclusion relations among the extracted combinations. Particularly, as known, a load of processing in the former phase is heavy.

As a processing method in the phase of extracting, Apriori Algorithms proposed by R. Agrawal, et. al. are well known.

The processing method described in "Fast Algorithms for Mining Association Rules" in proceedings of the $20^{th}$ VLDB (Very Large Data Bases) Conference, pages 487–499, 1994 is as follows.

An appearance number of each purchased item is counted in the purchase history data, and items of which appearance number reaches a certain value are extracted as frequent items.

Two different frequent items are combined as a candidate 2-itemset ("2" in the "candidate 2-itemset" shows a number of combined items).

An appearance number of the candidate 2-itemset in the purchase history data is counted, and the candidate 2-itemset of which appearance number reaches a certain value is extracted as a frequent 2-itemset.

If $k>=3$, following steps are repeated.

Two itemsets including one different item are chosen from frequent $(k-1)$-itemsets, and an itemset of k items including each item from the both sets, i.e., candidate k-itemset, is generated.

However, an itemset including a combination of items, which is not in the frequent $(k-1)$-itemset, is excluded from the candidate k-itemset.

When the candidate k-itemset becomes empty, the processing is ended.

An appearance number of the candidate k-itemset in the purchase history data is counted, and a set of which appearance number reaches a certain value is extracted as a frequent k-itemset.

For counting the appearance number of the combination of the items, only same time purchase should be counted. Since a number of items purchased at a same time is variable, it is not appropriate to represent all the items purchased at the same time by a record in the purchase history data. Therefore, as shown in (1) of FIG. 29, it is general that the record is configured for each of the items, and a combination of items purchased at a same time is represented by the records with a same transaction ID (Identification Data).

Therefore, for finding a combination of k items, it is necessary to produce a record including k items with a same transaction ID by joining the purchase history data with itself $k-1$ times (self-join).

However, in an existing database system, a load of the self-join operation is heavy, and the performance is not enough. Therefore, in most of association rule mining systems such as a data mining processing method described in Japanese Unexamined Published Patent Application Hei 11-3342 (published on Jan. 6, 1999) "A Group-By Processing Method," the purchase history data are extracted from the database system in advance, converted to a file in a unique form including items in a variable number as shown in (2) of FIG. 29, and processing is performed by using a special software.

SUMMARY OF THE INVENTION

In a relational database system according to the related art, since a join operation within a same table is not considered, only a processing method for different tables can be used. Therefore, it is impossible to offer a practically sufficient performance for a processing such as the association rule mining which includes many self-join operations.

However, the mining system according to the related art such as Japanese Unexamined Published Patent Application Hei 11-3342 for extracting the frequent itemset outside the database system has problems as follows.

An overhead exists in extracting the mass data.

Since data are copied, extra disk area and managing operations are necessary.

It is one of objects of this invention to solve the above-stated problems in the related art. Particularly, some of the aims of this invention are as follows.

No overhead exists in extracting the mass data.

Since data are not copied, extra disk area and managing operations are not necessary.

By improving the performance of the database system by parallelization, etc., the performance can be improved without changing the mining system.

For achieving the above aims, a content of the query is analyzed, and it is also judged if the database operation processor uses a self-join operation. If the self-join operation is used, a processing method, which is effective and efficient only for the self-join operation, is used instead of an ordinary processing method of the join operation. Accordingly, the query including the self-join operation can be processed efficiently.

According to an aspect of this invention, a database operation processor includes a database for storing data, a query analyzer for inputting and analyzing a query statement for the database, an operation expression generator for generating an operation expression for executing the query statement by inputting an analysis result of the query analyzer, and an operation expression executor for executing the operation expression generated by the operation expression generator and obtaining data satisfying the query statement from the database. The database stores a plurality of tables storing records including at least a column, and the operation expression generator includes a self-join detector for detecting join processing for joining records stored in two tables according to a determined join condition by inputting an analysis result of the query analyzer, detecting if the detected join processing is a self-join operation processing where said two tables are same and the determined join condition is a join condition for a same column, and generating a self-join operation expression for executing the detected self-join operation processing. The operation expression executor executes the self-join operation expression generated by the self-join detector and producing a result of the self-join operation processing.

According to another aspect of this invention, the database operation processor includes a database for storing data, a query analyzer for inputting and analyzing a query statement for the database, an operation expression generator for generating an operation expression for executing the query statement by inputting an analysis result by the query analyzer, and an operation expression executor for executing the operation expression generated by the operation expression generator and obtaining data satisfying the query statement from the database. The database stores a plurality of tables storing records including at least a column, and the operation expression executor includes a self-join detector for detecting a join operation expression for joining records stored in two tables according to a determined join condition by inputting the operation expression generated by the operation expression generator, and detecting if the detected join operation expression is a self-join operation processing where said two tables are same and the determined join condition is a join condition for a same column, and a self-join operation executor for producing a result of the self-join operation processing when the self-join operation processing is detected by the self-join detector.

According to another aspect of this invention, the database operation processor includes a database for storing data, a query analyzer for inputting and analyzing a query statement for the database, an operation expression generator for generating an operation expression for executing the query statement by inputting an analysis result of the query analyzer, and an operation expression executor for executing the operation expression generated by the operation expression generator and obtaining data satisfying the query statement from the database. The database stores a plurality of tables storing records including at least a column, and the query analyzer includes a self-join detector for inputting the query statement and analyzing a join processing for joining records stored in two tables according to a determined join condition and further detecting if the analyzed join processing is a self-join operation processing where said two tables are same and the determined join condition is a join condition for a same column, and outputting a self-join operation analysis result for instructing the operation expression generator to generate a self-join operation expression for executing the detected self-join operation processing. The operation expression generator generates the self-join operation expression according to the self-join operation analysis result output by the self-join detector, and the operation expression executor includes a self-join operation executor for executing the generated self-join operation expression by the operation expression generator according to the self-join operation analysis result output by the self-join detector and producing a result of the self-join operation processing.

Further features and applications of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Other objects features, and advantages of the invention will be apparent from the following description when taken in conjunction with the accompany drawings.

BRIEF DESCRIPTION OF THE DRAWINGS

FIG. 4 illustrates an example of a scan operation descriptor according to Embodiment 1 of this invention;

FIG. 5 illustrates an example of a select operation descriptor according to Embodiment 1 of this invention;

FIG. 6 illustrates an example of a join operation descriptor according to Embodiment 1 of this invention;

FIG. 7 illustrates an example of a self-join operation descriptor according to Embodiment 1 of this invention;

FIG. 21 illustrates a specific example of the self-join operation executor according to Embodiment 1 of this invention;

FIGS. 22(A), 22(B), and 22(C) illustrate specific examples of the self-join operation executor according to Embodiment 1 of this invention;

FIG. 23 illustrates a specific example of the self-join operation executor according to Embodiment 1 of this invention;

FIGS. 24(A), 24(B), and 24(C) illustrate specific examples of the self-join operation executor according to Embodiment 1 of this invention;

FIGS. 26(A), 26(B), and 26(C) illustrate extended examples of a query language for instructing self-join according to Embodiment 2 of this invention;

FIG. 30 illustrates an example of a self-join query used in association rule mining.

DETAILED DESCRIPTION OF THE PREFERRED EMBODIMENTS

Embodiment 1.

Figure 1:
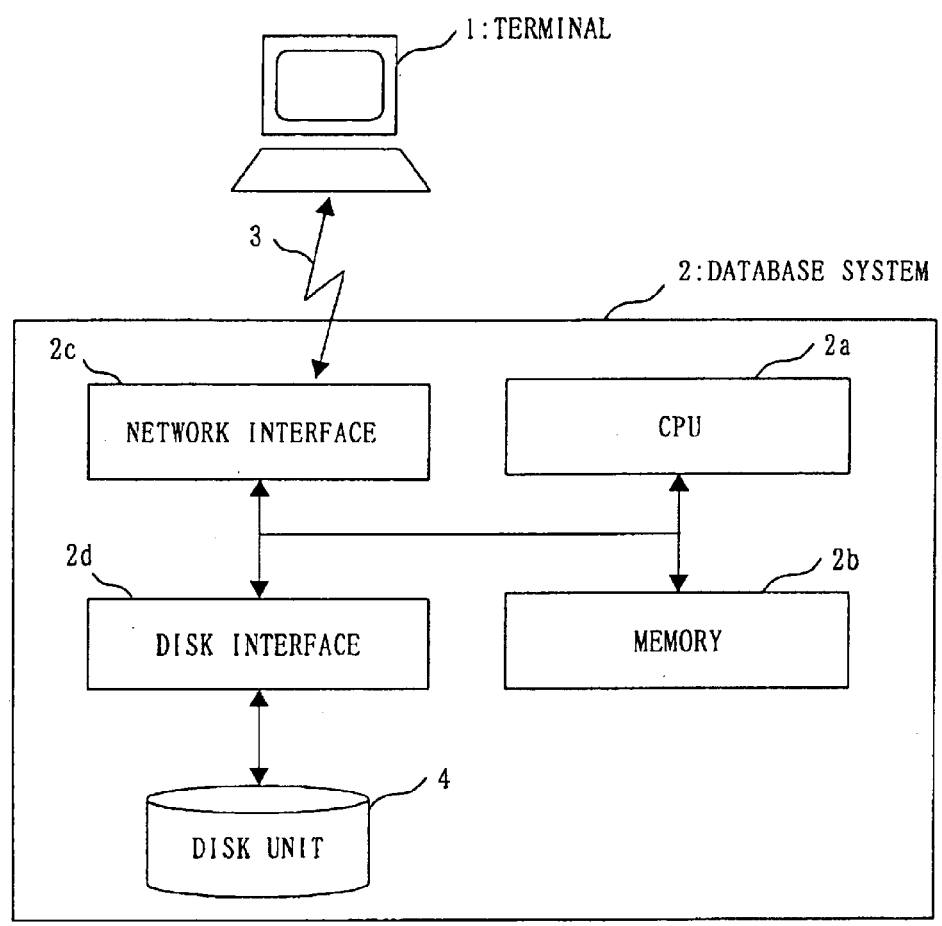
FIG. 1 shows a function block chart of a database system including a database operation processor according to Embodiments 1–4 of this invention.

FIG. 1 shows a block chart of a database system, which is a database operation processor according to this invention. In FIG. 1, a terminal 1, a database system 2, an access line 3, and a disk unit 4 are illustrated.

In FIG. 1, a CPU 2a, which is a processor of the database system 2, a memory 2b for storing a program executed by the CPU 2a and necessary variables for executing the program, records read from the disk unit 4 and records of a processing result, a network interface 2c which is a communication interface with the access line, and a disk interface 2d for accessing the disk unit 4 are also illustrated.

Figure 2:
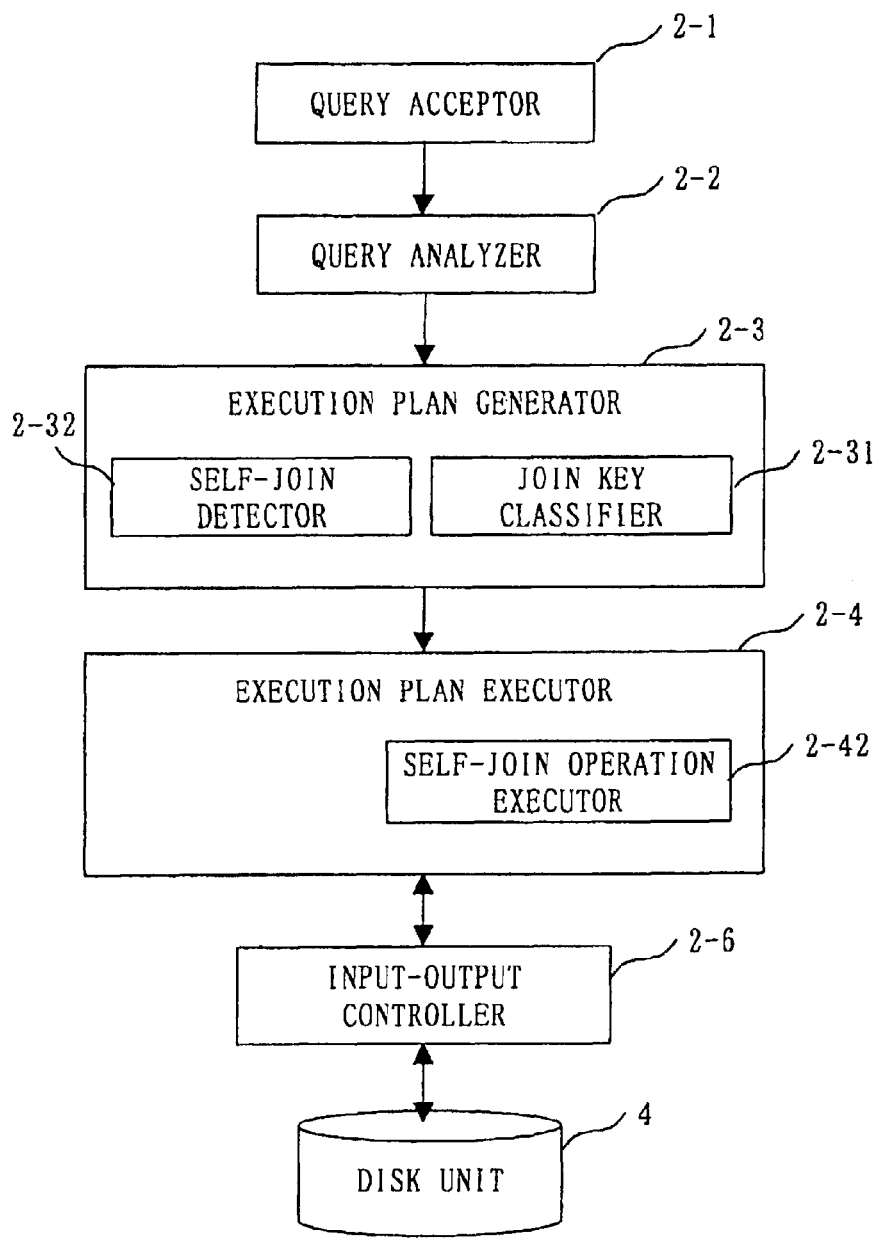
FIG. 2 shows a function block chart of the database operation processor according to Embodiment 1 of this invention.

FIG. 2 shows a detailed block chart of a configuration of the database system 2 in FIG. 1. FIG. 2 illustrates a query request acceptor 2-1 for accepting a query request from the terminal 1. For example, the query request acceptor 2-1 can use an interface such as known CLI (Call Level Interface), ODBC (Open Database Connectivity), etc. according to SQL (Structured Query Language).

In FIG. 2, a query analyzer 2-2 for analyzing a meaning of a query statement in an accepted query and an execution plan generator (operation expression generator) 2-3 for determining an execution method of the query based on an analysis result of the query statement and generating an operation expression for executing the query statement are also illustrated. Generally, the query analyzer 2-2 and the execution plan generator 2-3 are combined and realized as a SQL (Structured Query Language) compiler, for example.

The execution plan generator 2-3 includes a join key classifier (join key classifying unit) 2-31 and a self-join detector (self-join detecting unit) 2-32. When a join operation is included in the query statement, the join key classifier 2-31 classifies a join key into an equi-join key and a non equi-join key. The self-join detector 2-32 judges if the join operation included in the query statement is a self-join operation, and generates a self-join operation expression based on a judgement result.

An execution plan executor (operation expression executor) 2-4 executes query processing according to a query execution plan generated by the execution plan generator 2-3, and a self-join operation executor (self-join operation executing unit) 2-42 executes a self-join operation in the query execution plan.

The disk unit 4 stores a database, and an input-output controller 2-6 controls inputting to the disk unit 4 and outputting from the disk unit 4.

Compared with the related art, embodiments of this invention particularly include the join key classifier 2-31, the self-join detector 2-32, and the self-join operation executor 2-42.

Figure 3:
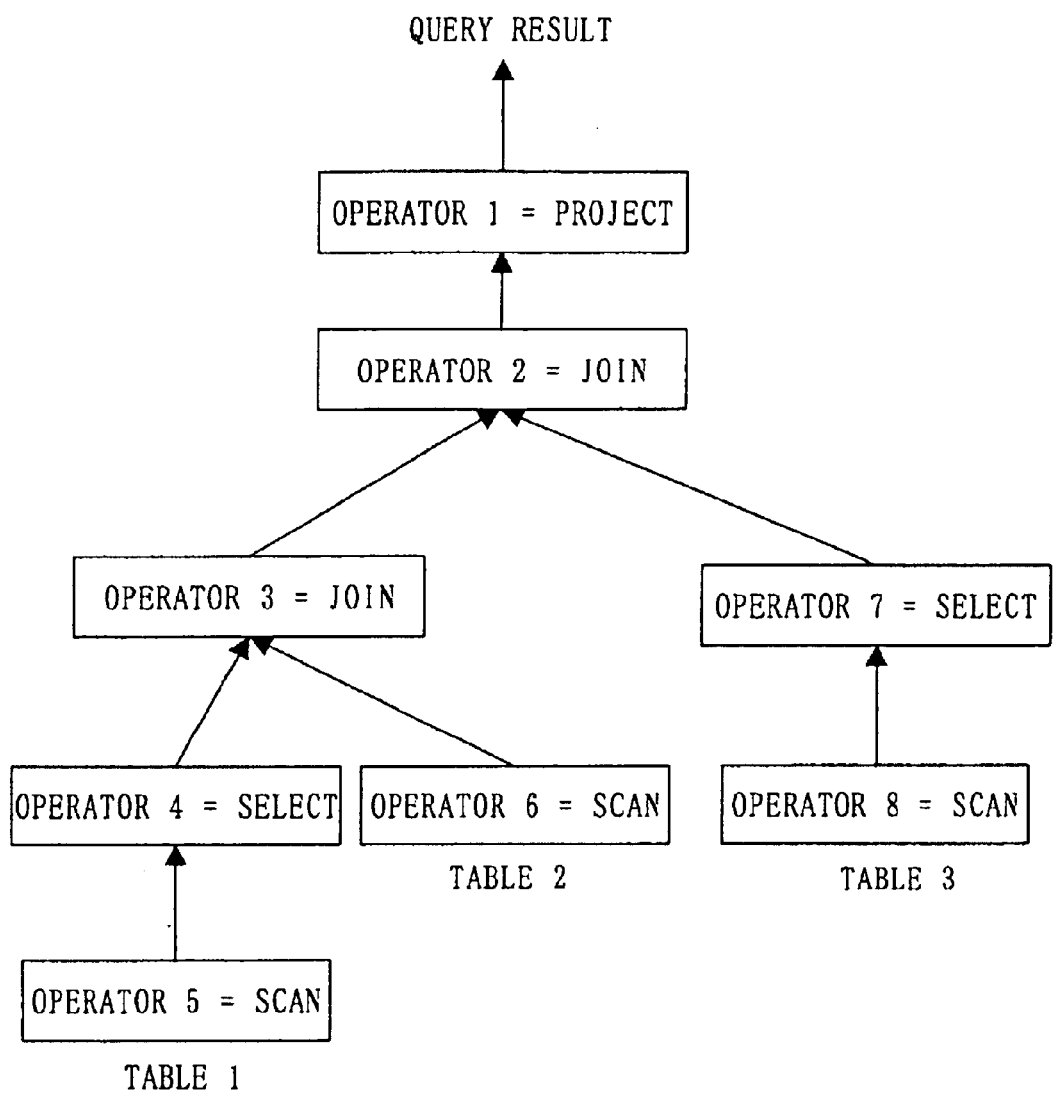
FIG. 3 illustrates an example of an analysis result of a query according to Embodiment 1 of this invention.

FIG. 3 illustrates an example of the analysis result of the query statement which is sent from the query analyzer 2-2 to the execution plan generator 2-3. The analysis result of the query statement can be expressed in a tree structure with a query result at a root and an input table at a leaf, for example. At a node of the tree structure, an operator expressing an operation for an input is provided. The operator shows an operation expression including information on a kind of operations, information on a condition, information on a table to be input, etc.

As the operator, there are a scan operator for inputting a record group from the disk unit, a select operator for excluding a record which does not satisfy a provided condition, a project operator for manipulating a column, a join operator for producing an output record from columns of two input records, an aggregate operator for calculating statistical values for all input records, etc.

All the operators output record groups in a same form, which are called as intermediate tables. The operators except the scan operator receive the record groups of the intermediate tables output by other operators as inputs. The join operator receive two inputs, and the select, project, aggregate, etc. operators receive one input.

FIG. 4 illustrates a scan operation descriptor, which is a specific example of an expression of the scan operator. A name of a table to be scanned and column information of a record to be read are stored in an area of the scan operation descriptor located in a memory of a computer.

FIG. 5 illustrates a select operation descriptor, which is a specific example of an expression of the select operator. A pointer to an operation descriptor which receives an input, a conditional expression representing a select condition, and column information of a join result record are stored in an area of the select operation descriptor located in the memory of the computer. In FIG. 5, an input operation descriptor "#1" is a pointer to an operation descriptor, and "#1" corresponds to an operation identifier "#1" in FIG. 4.

FIG. 6 illustrates a join operation descriptor, which is a specific example of an expression of the join operator. A pointer to two operation descriptors which receive an input, a conditional expression representing a join condition, and column information of a join result record are stored in an area of the join operation descriptor located in the memory of the computer. In FIG. 6, a first input operation descriptor "#2" and a second input operation descriptor "#3" are pointers to two operation descriptors which receive the input.

In embodiments of this invention, a self-join operator is provided as an operator for expressing join within the same table. FIG. 7 illustrates a self-join operation descriptor, which is a specific example of an expression of the self-join operator. A pointer to an input operation descriptor, a multiplexing level of the join, a conditional expression representing a join condition, and column information of the join result record are stored in an area of the self-join operation descriptor located in the memory of the computer.

In FIG. 7, the input operation descriptor "#2" is a pointer to the input operation descriptor.

In this explanation, the multiplexing level of the join shows a number of the self-join of the input table. For a self-join, the multiplexing level is 2.

Operations of the self-join detector 2-32 in this embodiment are explained.

Figure 8:
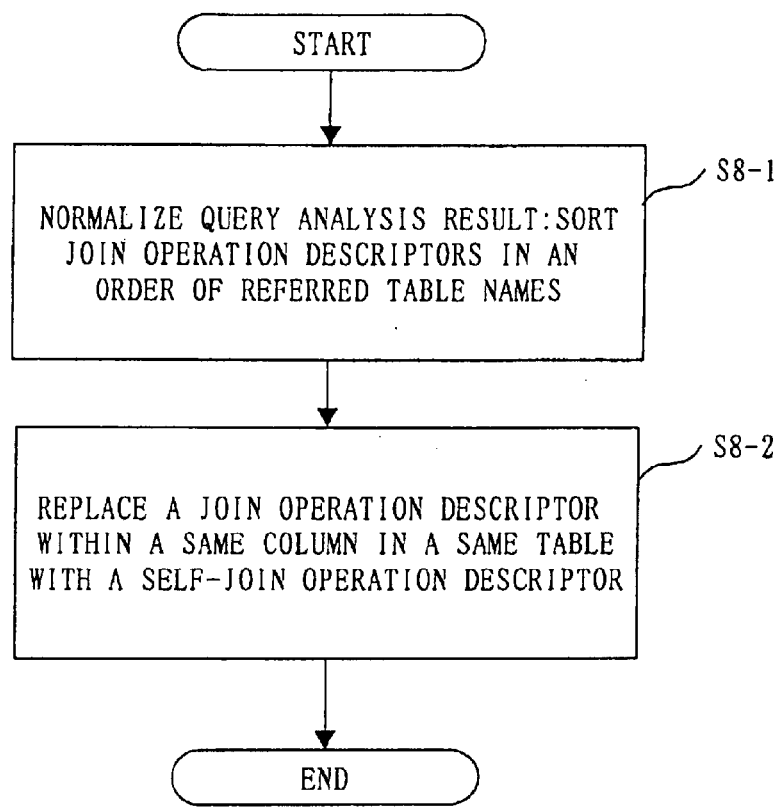
FIG. 8 shows a flow chart of operations of a self-join detector according to Embodiment 1 of this invention.

FIG. 8 shows a flow chart for explaining the operations of the self-join detector 2-32.

In FIG. 8, the analysis result of the query received from the query analyzer 2-2 is normalized in step S8-1. Table names of the join operation descriptor and the scan operation descriptor are noticed, and an order of the join operation descriptors is changed to a lexicographic order of the table names so that the join operation descriptors for receiving the same table as an input are contiguous.

The normalization operation must be executed without changing the query result. Therefore, when an operation such as an aggregate operation, union operation, etc. is included, an order of the join operators, between which an operation descriptor of the aggregate operation, union operation, etc. is put, should not be changed. Stated equivalent conversion of the analysis result of the query is publicly known, and it is described in "An Introduction to Database Systems," Chapter 18, C. J. Date, $6^{th}$ edition, 1995, Addison-Wesley.

Figure 9:
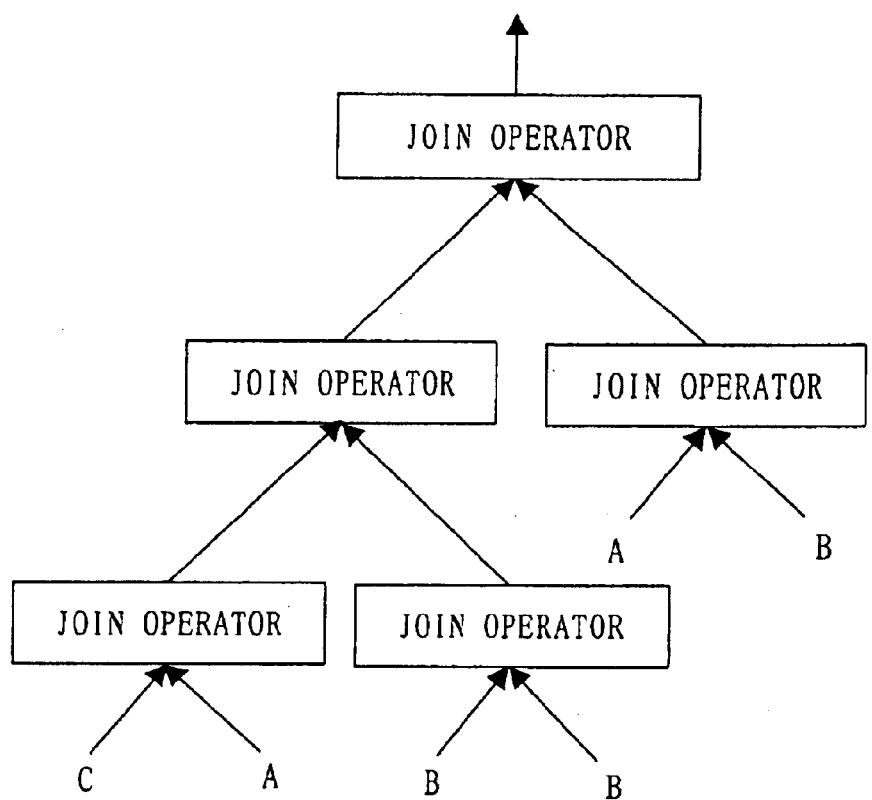
FIG. 9 illustrates an example of the analysis result of the query before normalizing processing according to Embodiment 1 of this invention.
Figure 10:
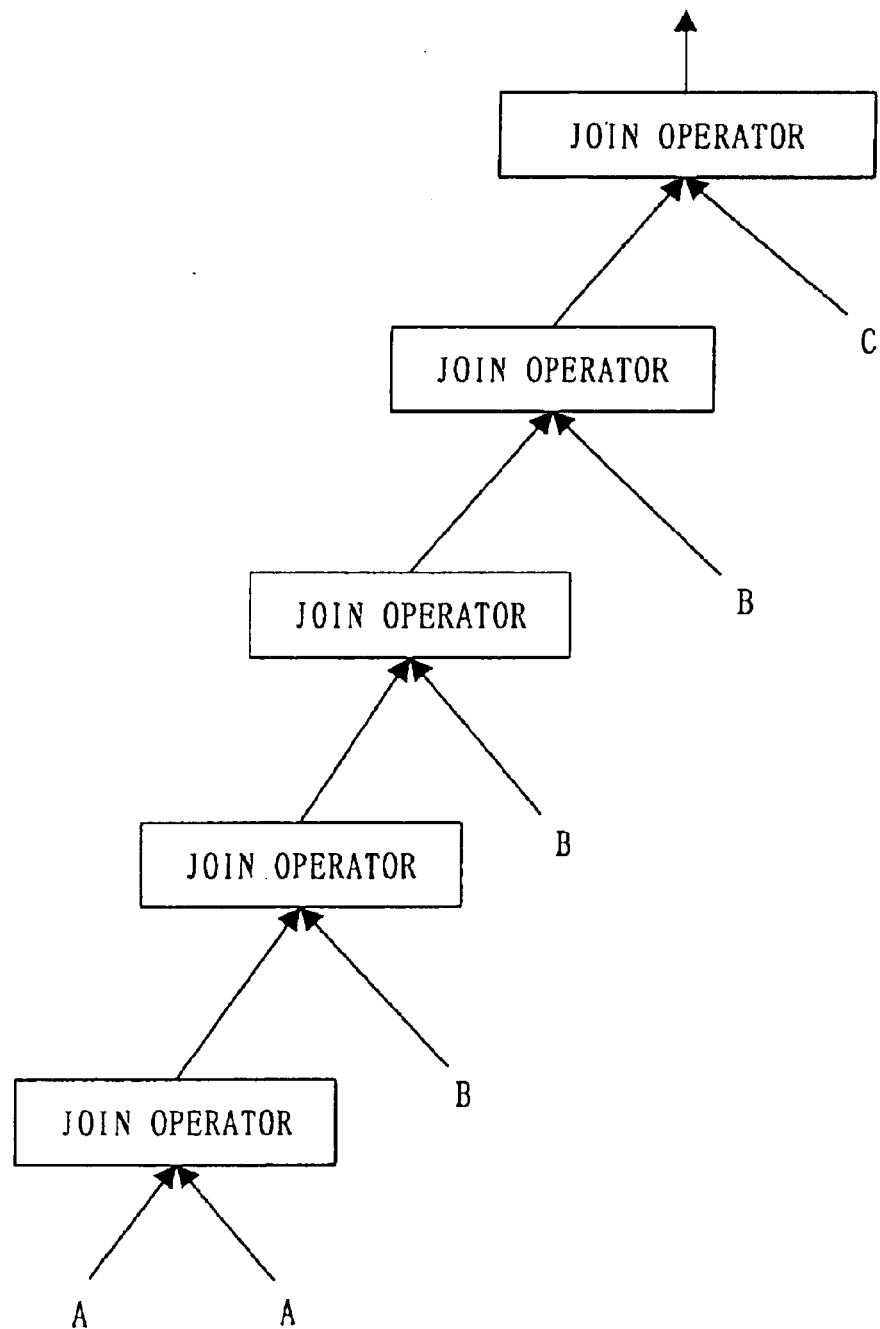
FIG. 10 illustrates an example of the analysis result of the query after normalizing processing according to Embodiment 1 of this invention.

FIG. 9 illustrates a join operation descriptor and an input table extracted from an example of the analysis result produced by the query analyzer 2-2 for a certain query statement. FIG. 10 illustrates the join operation descriptor and the input table extracted from a normalized result of the analysis result in FIG. 9.

In step S8-2, among the join operation descriptors of a normalizing result, the join operation descriptor receiving a same table as an input and using a set of a same column as a join key is replaced with the self-join operation descriptor.

FIGS. 11, 12, 13 and 14 illustrate a method for replacing with the self-join operation descriptor.

Figure 11:
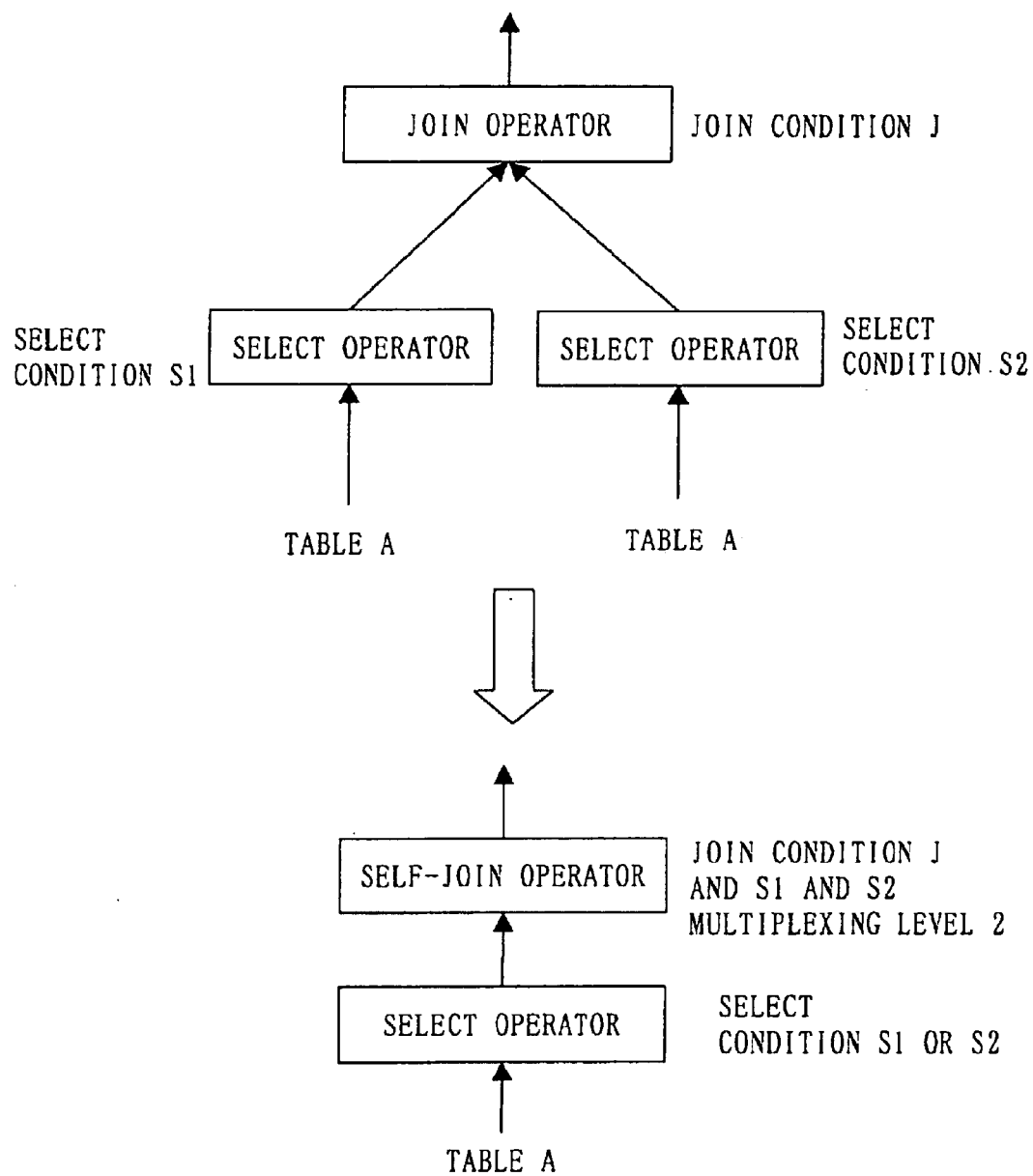
FIG. 11 illustrates a method for replacing a join operator with a self-join operator according to Embodiment 1 of this invention.

FIG. 11 illustrates a replacement rule applied to a case where two inputs of the join operators at a bottom of a normalized analysis result of the query are a same table and the join key is a set of a same column. The join operator is replaced with the self-join operator, and two select operators are integrated.

A select condition of an integrated select operator is a logical addition (OR) between original two select conditions. In a special case where one or both of the select operators do not exist, the select condition is always regarded as "true." Therefore, a select condition after integration is always "true," and that is equivalent to a case without the select operator. Further, when the select conditions of both of the select operators are equal, the select condition after integration is equal to the original select condition.

The join condition of the self-join operator is a logical multiplication (AND) among the join condition of the original join operator and the original two select conditions. A multiplexing level of the self-join operator is 2.

Figure 12:
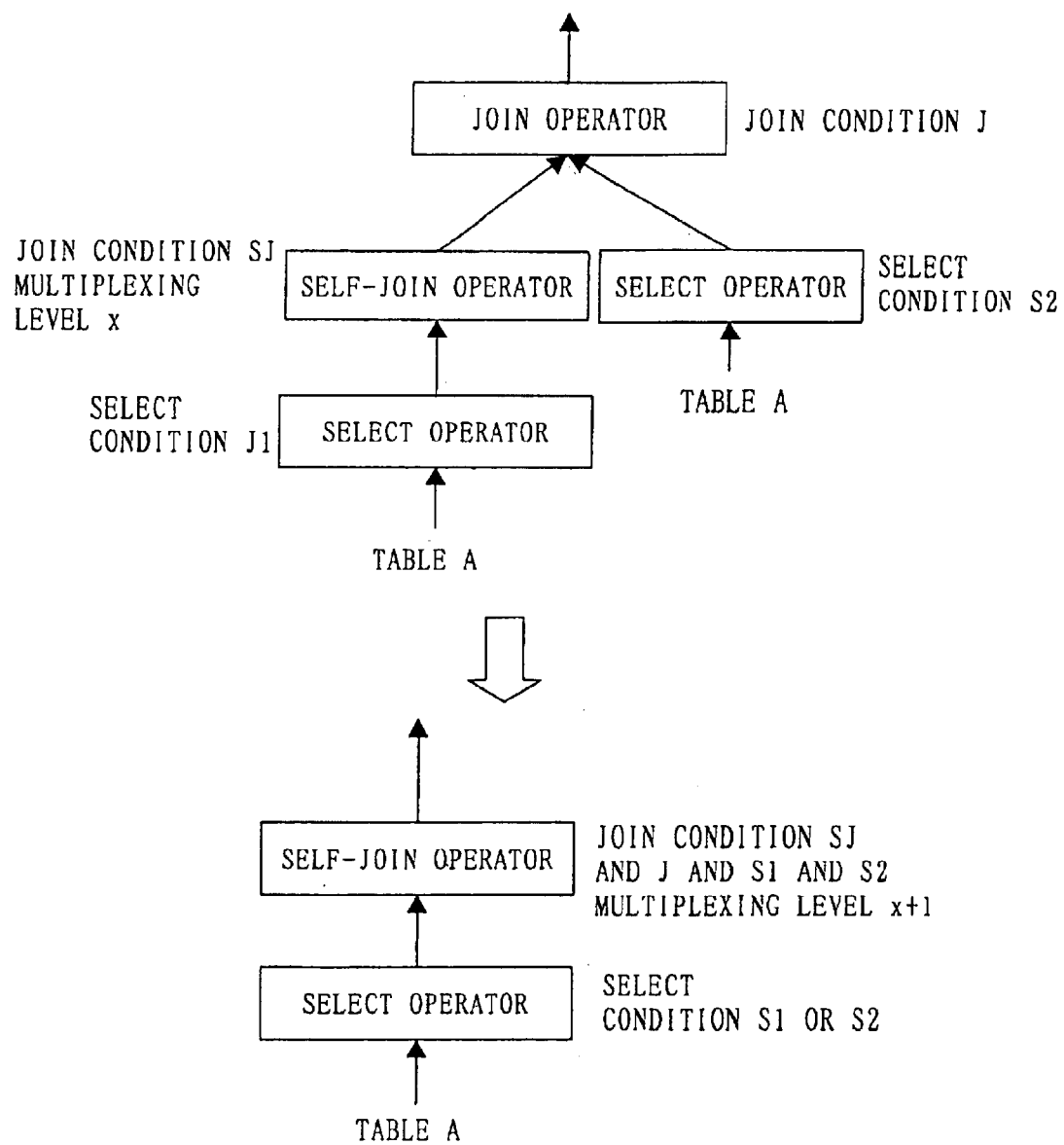
FIG. 12 illustrates a method for replacing the join operator with the self-join operator according to Embodiment 1 of this invention.

FIG. 12 becomes effective after replacing in FIG. 11. FIG. 12 shows a replacement rule applied to a case where an input of the join operator at the bottom is a self-join result of a table, an input of another join operator at the bottom is a same table, and the join key is a same column. The join operator is integrated with the self-join operator, and two select operators are integrated. The select condition of the integrated select operators is a logical addition (OR) between the original two select conditions as in FIG. 11. The join condition of the self-join operator is a logical multiplication (AND) among the join condition between the original self-join operator and the join operator and the original two select conditions. The multiplexing level of the self-join operator is the multiplexing level of the original self-join operator plus one.

Figure 13:
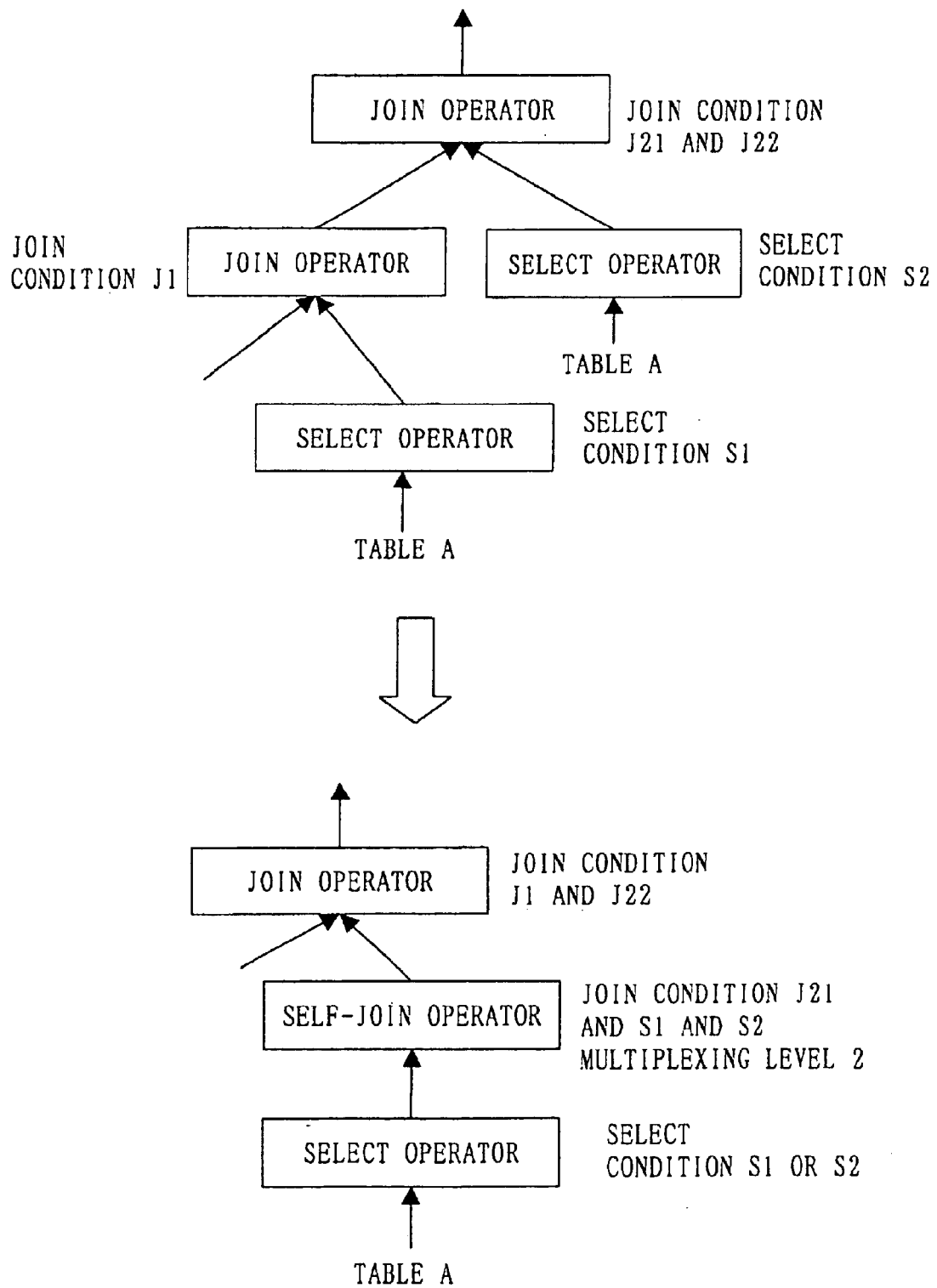
FIG. 13 illustrates a method for replacing the join operator with the self-join operator according to Embodiment 1 of this invention.

FIG. 13 shows a replacement rule applied to a case where inputs of two join operator, which are not at the bottom of the normalized analysis result of the query, are the same table, and the join key is a set of the same column. Two join operators are replaced with the self-join operator and the join operator, and two select operators are integrated. The select condition of the integrated select operator is a logical addition (OR) between original two select conditions. Further, the join condition of an upper one of the original join operators is divided into a logical multiplication (AND) between two conditions J21 and J22, and the condition J21 is set to include a column of a table to be self-joined. When the join condition including only the column of the self-joined table does not exist, the condition J21 is set at a logical value of "true," and the original join condition is set as J22.

The join condition of the self-join operator generated by replacing is a logical multiplication (AND) among the condition J21 and the original two select conditions. The join condition of the join operator is a logical multiplication (AND) between the join condition J1 of a lower one of the original join operators and the condition J22. The multiplexing level of the self-join operator is 2.

Figure 14:
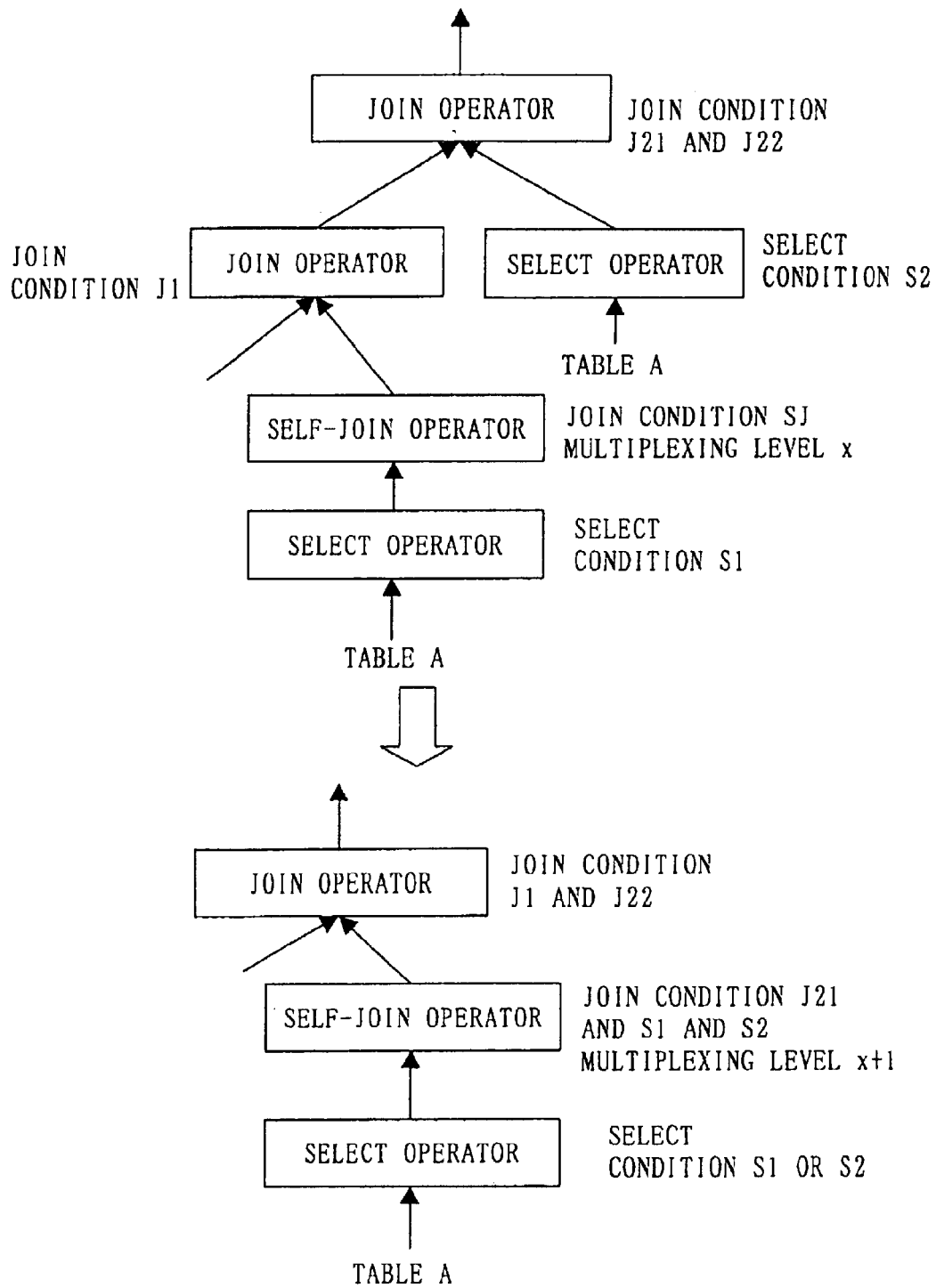
FIG. 14 illustrates a method for replacing the join operator with the self-join operator according to Embodiment 1 of this invention.

FIG. 14 becomes effective after replacing in FIG. 13. FIG. 14 shows a replacement rule applied to a case where an input of one of two join operators which are not at the bottom is a self-join result of a table, an input of another one of the join operators is the same table, and the join key is the same column. The self-join operator and two join operators are replaced with a self-join operator and a join operator, and two select operators are integrated. A select condition of the integrated select operators is a logical addition (OR) between original two select conditions. Further, the join condition of an upper one of the original join operators is divided into a logical multiplication (AND) between two conditions J21 and J22, and the condition J21 is set to include only a column of the table to be self-joined.

The join condition of the self-join operator generated by replacing is a logical multiplication (AND) among the join condition of the original self-join operator, the condition J21, and original two select conditions. The join condition of the join operator is a logical multiplication (AND) between the join conditions J1 which is a lower one of the original join operators and the condition J22. The multiplexing level of the self-join operator is the multiplexing level of the self-join operator plus one.

Figure 15:
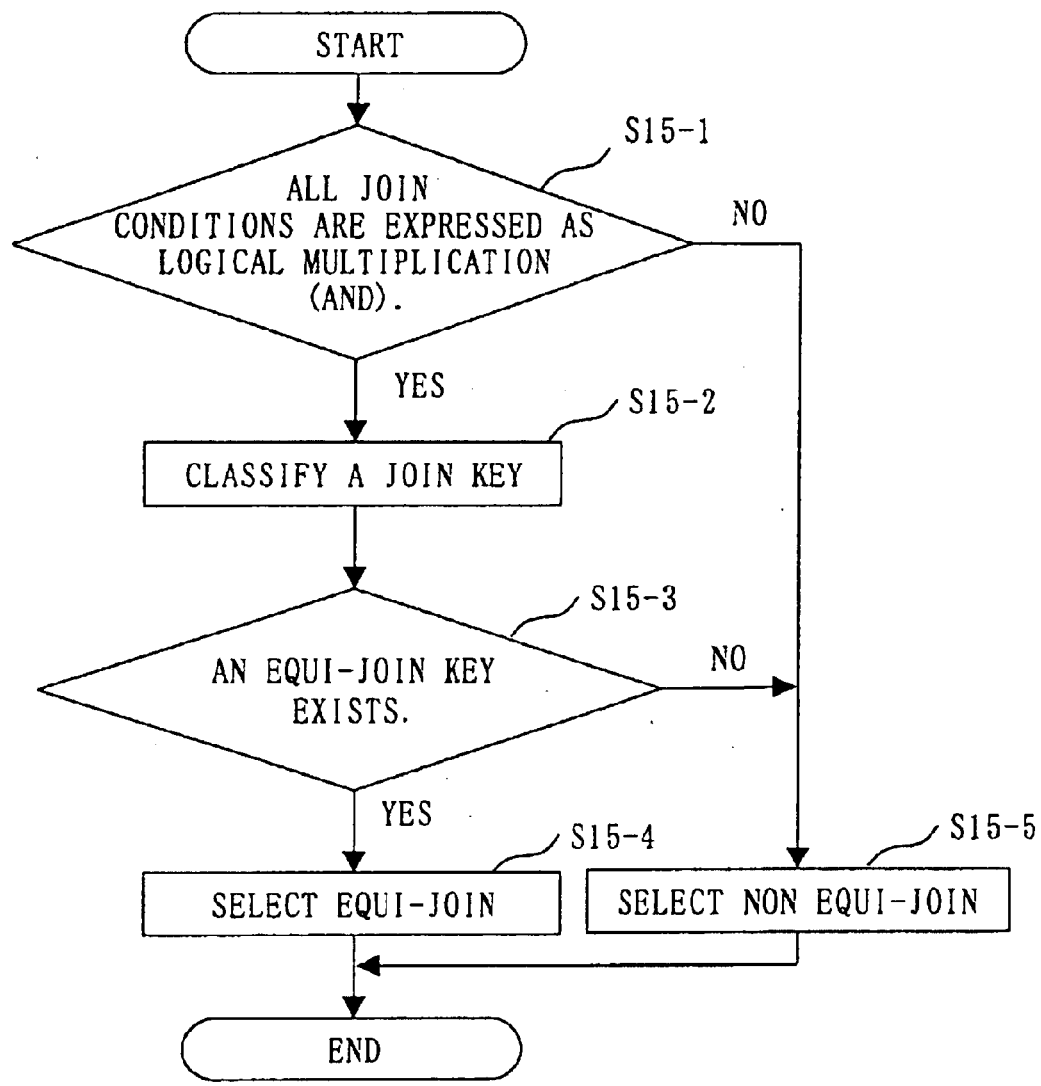
FIG. 15 shows a flow chart of operations of a join key classifier according to Embodiment 1 of this invention.
Figure 16:
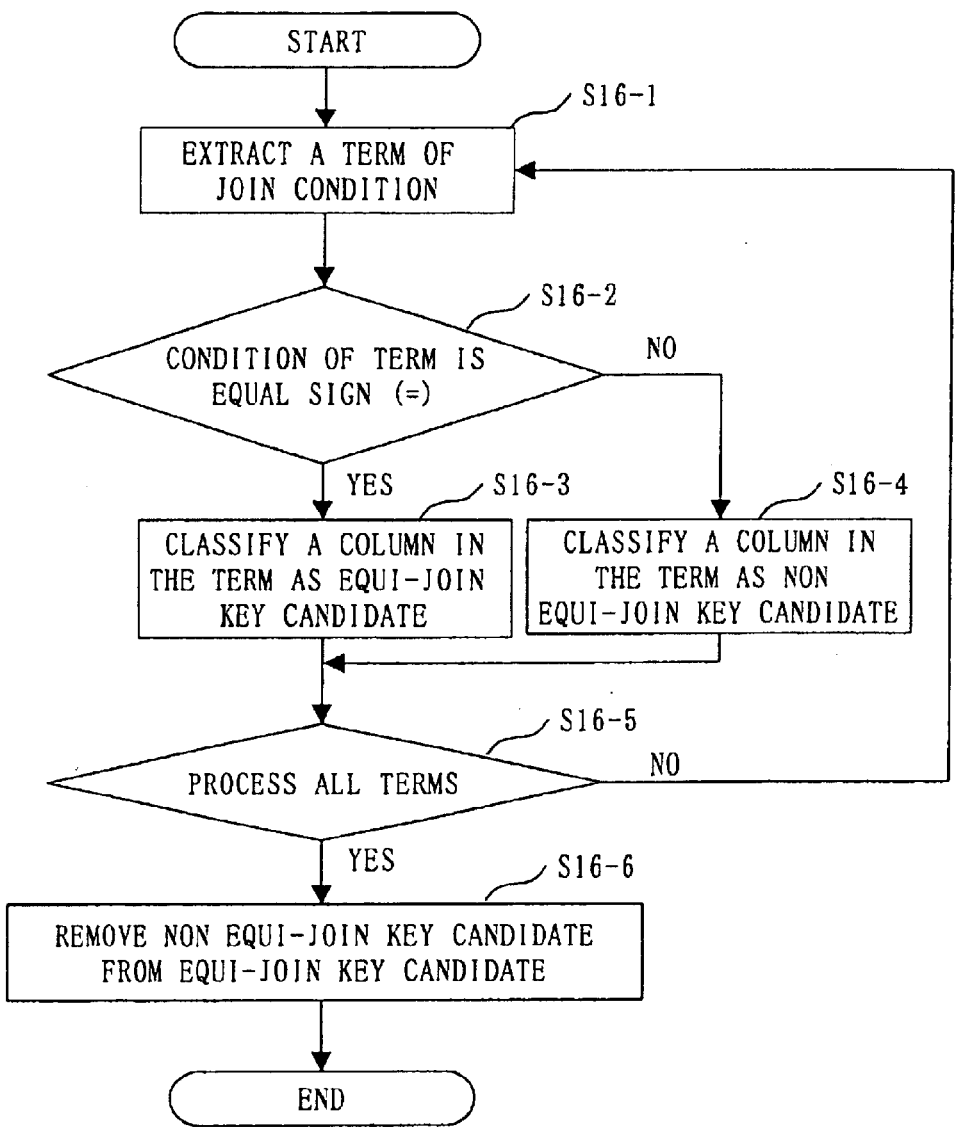
FIG. 16 shows a detailed flow chart for explaining a step in operations of the join key classifier according to Embodiment 1 of this invention.

Next, with reference to flow charts of FIGS. 15 and 16, operations of the join key classifier 2-31 are explained. The join key classifier 2-31 inputs an operation expression where the join operator is replaced with the self-join operator by the self-join detector 2-32. In step S15-1 of FIG. 15, a judgement is made if a condition for joining records in two tables described in the operation expression can be expressed as a logical multiplication (AND) of a simple comparison expression. If the condition is expressed as the logical multiplication (AND) of the simple comparison expression, processing goes to step S15-2. If the condition is not expressed as the logical multiplication (AND) of the simple comparison expression, the processing goes to step S15-5. In step S15-2, the column, which appears in the join condition, is classified into an equi-join key and a non equi-join key in a later-stated method. In step S15-3, a judgement is made if there is at least an equi-join key in the join condition. If there is at least an equi-join key, processing goes to step S15-4. If there is no equi-join key, the processing goes to step S15-5. In step S15-4, the equi-join is selected as an execution method of the join operation. In step S15-5, the non equi-join is selected as the execution method of the join operation.

In the equi-join, a search range of matching records can be narrowed by partitioning or sorting an input table by a join key value. Therefore, efficient processing is possible. However, in the non equi-join, all combinations of the records must be tested if they satisfy the join condition. Hence, processing load is very heavy.

The equi-join according to the related art is only applied to a case where all the join keys are equi-join keys. However, in the embodiments of this invention, even if only a part of the join keys is the equi-join key, the join operation is executed by using only the equi-join key as the join key at first. Then, a conditional expression of the non equi-join key is tested for a result and a select operation is executed. Accordingly, the equi-join operation can be used as much as possible.

FIG. 16 shows a detailed flow chart for explaining the operations in step S15-2 in FIG. 15.

In step S16-1 of FIG. 16, a comparison term included in the join condition is extracted from the conditional expression represented by using the relational operator of the logical multiplication (AND). In step S16-2, a judgement is made if a comparison operator of the extracted term is an equal sign. If it is the equal sign, processing goes to step S16-3. If it is not the equal sign, processing goes to step S16-4. In step S16-3, a column included in the extracted term is classified as an equi-join key candidate. In step S16-4, the column included in the extracted term is classified as a non equi-join key candidate. In step S16-5, a judgement is made if all terms in the conditional expression are processed. If there is an unprocessed term, the processing goes back to step S16-1. After processing all the terms, in step S16-6, the equi-join key candidate which is also the non equi-join key candidate is removed from the equi-join key candidates, and a remaining candidate is used as the equi-join key. The non equi-join key candidate is used as the non equi-join key.

Figure 17:
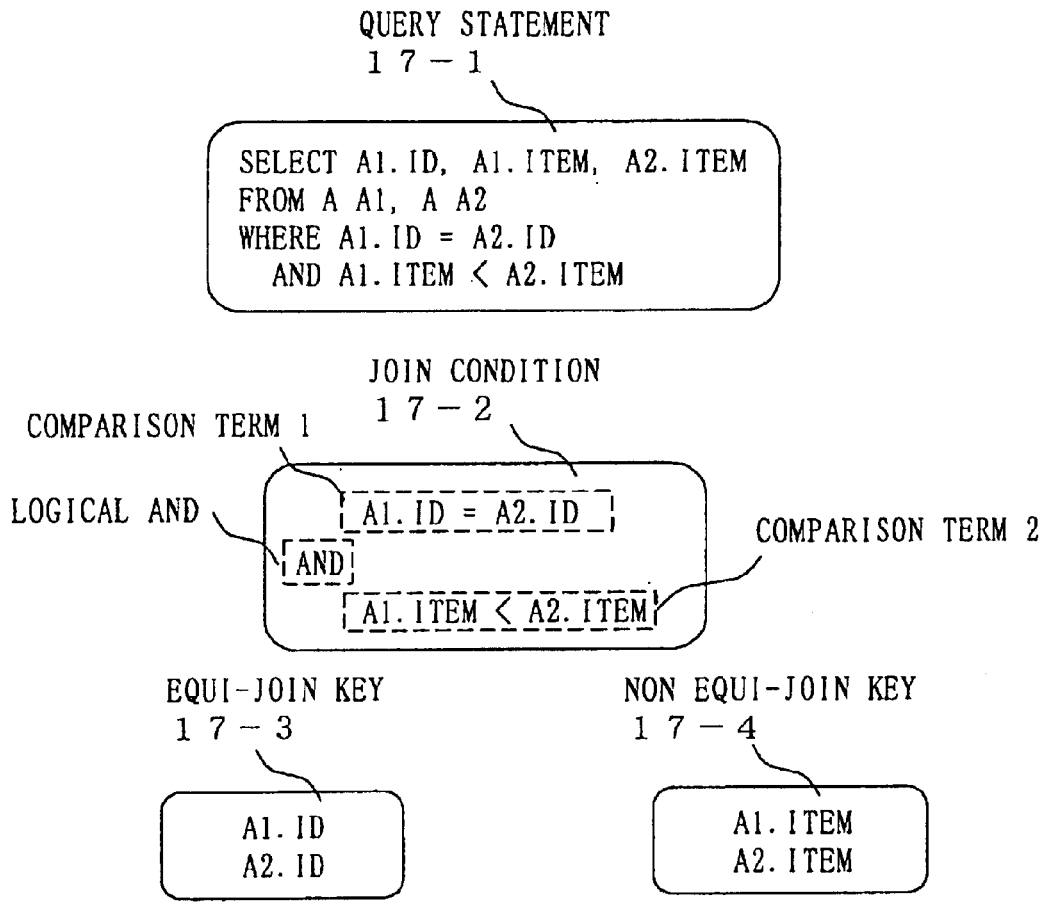
FIG. 17 illustrates an example of specific operations of the join key classifier according to Embodiment 1 of this invention.

FIG. 17 shows an explanatory chart of operation of the join key classifier 2-31 as an example of a query including a specific join condition.

In FIG. 17, an original query statement 17-1 expresses a join operation. The query statement 17-1 processes table "A", and a description of "FROM A A1,A A2" represents referring to table "A" by two names of "A1" and "A2". A join condition 17-2 is extracted from an analysis result of the query statement 17-1. The join condition 17-2 is expressed as a logical multiplication (AND) between two simple comparison operation terms 1 and 2. In judging if the comparison operation is an equal sign or not, A1.ID and A2.ID are classified into the equi-join key as illustrated in 17-3, and A1.ITEM and A2.ITEM are classified into the non equi-join key as illustrated in 17-4.

As stated earlier, since both "A1" and "A2" are table "A", "A1.ID" and "A2.ID" show a same column, and "A1.ITEM" and "A2.ITEM" show a same column.

The join operation in this query is not the equi-join as a whole. However, since the equi-join operation key is included, the equi-join operation by using data stored in column "ID" as the join key is selected.

Figure 18:
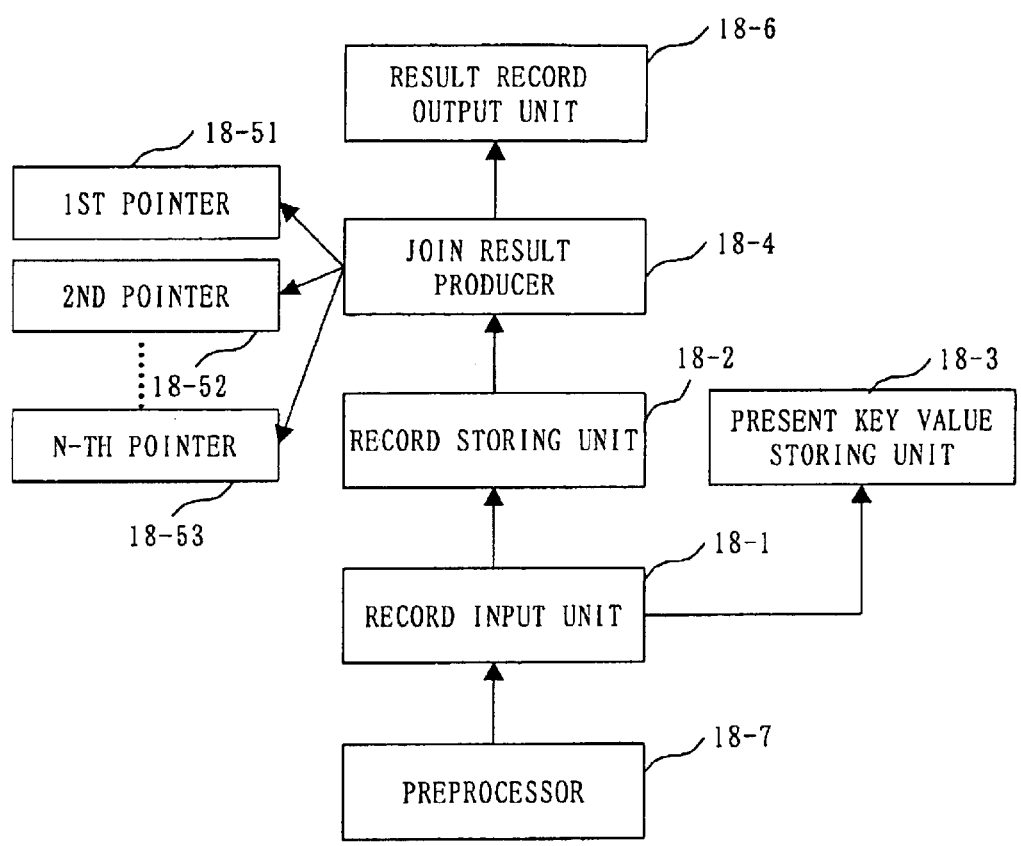
FIG. 18 shows a function block chart of a self-join operation executor according to Embodiment 1 of this invention.

FIG. 18 shows a detailed block chart of the self-join operation executor 2-42.

The self-join operation executor 2-42 resembles to the sort merge join processing method. However the self-join operation executor 2-42 is different from the sort merge join processing method. The self-join operation executor 2-42 can execute a plurality of self-joins while inputting a table, sorting the table, and outputting the join result each once. When the multiplexing level of the self-join is N, the sort merge join processing method includes N times inputting the table, N times sorting the table, and N−1 times outputting the join result. Therefore, an execution speed is low.

In FIG. 18, a preprocessor (sorting processor) 18-7 sorts the input table by the equi-join key, and produces an intermediate table. However, if it is judged that the input table has been sorted by the equi-join key, sorting can be omitted. In an example of FIG. 17, the preprocessor 18-7 inputs table "A" to be sorted.

A record input unit 18-1 is a unit for inputting the sorted intermediate data or a record from the sorted table through the input-output controller 2-6, and a record storing unit (record storage) 18-2 is a unit for storing a plurality of input records in a buffer in a memory which is not illustrated. A present key value storing unit 18-3 is a unit for storing an equi-join key value of the record stored by the record storing unit 18-2, and a join result producer (join result producing unit) 18-4 is a unit for producing a join result from the record stored in the buffer by the record storing unit 18-2.

First, second, . . . N-th pointers 18-51, 18-52, and 18-53 are used when the join result producer 18-4 accesses the record stored in the buffer by the record storing unit 18-2. N is a multiplexing level of the self-join operation. The multiplexing level of the self-join operation can be obtained by the self-join detector.

A result record output unit (result output unit) 18-6 is a unit for outputting a result record produced by the join result producer 18-4.

Figure 19:
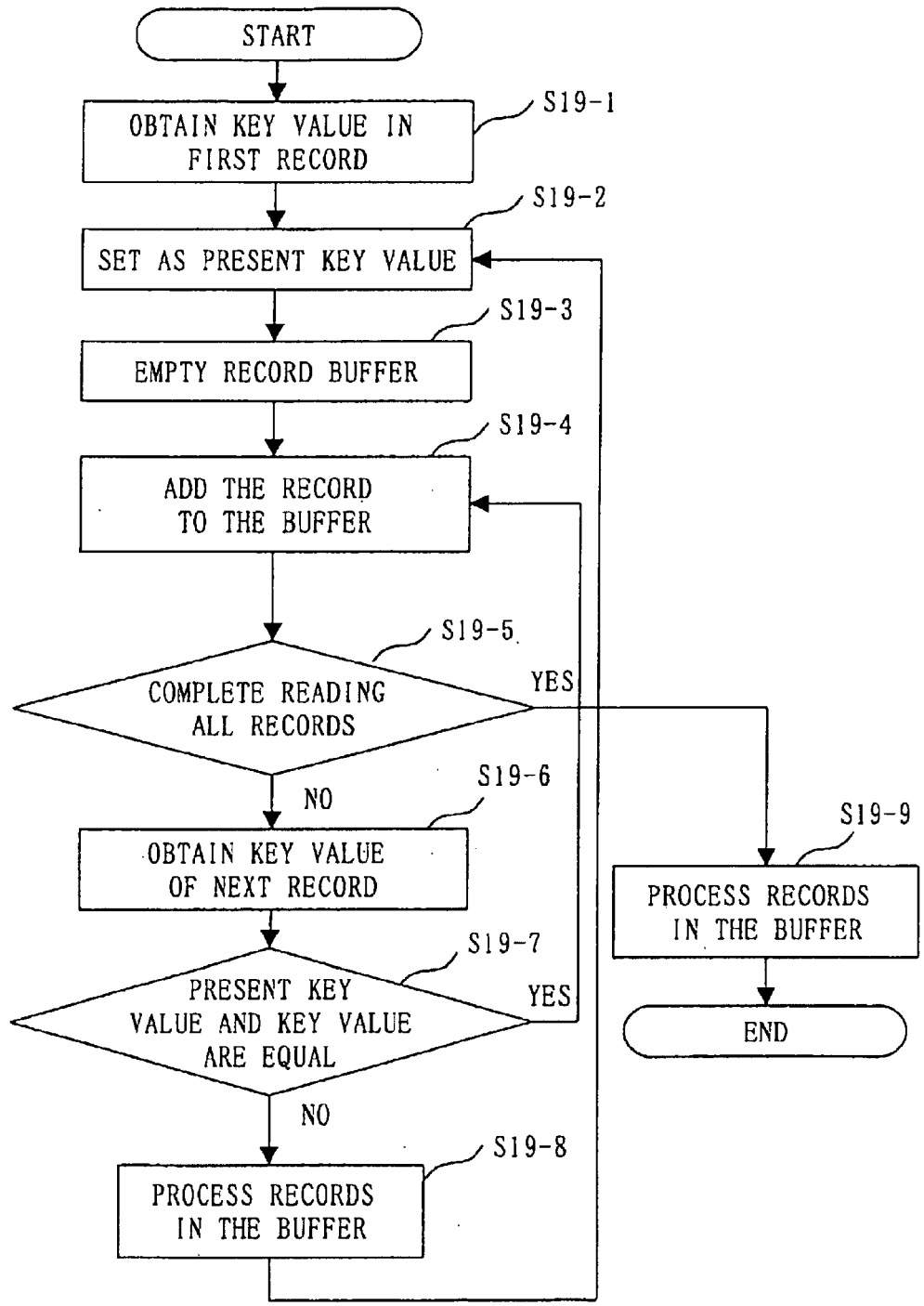
FIG. 19 shows a flow chart of operations of the self-join operation executor according to Embodiment 1 of this invention.

With reference to a flow chart of FIG. 19, operations by the self-join operation executor of FIG. 18 after processing by the preprocessor 18-7 are explained. In step S19-1 of FIG. 19, an equi-join key value in a first record is obtained from the sorted intermediate table by the record input unit 18-1. In step S19-2, the obtained key value is stored by the present key value storing unit 18-3. In step S19-3, the buffer is initialized by the record storing unit 18-2, and the buffer is emptied. In step S19-4, the record input by the record input unit 18-1 is stored in the buffer by the record storing unit 18-2. In step S19-5, a judgement is made if a next record is in the sorted intermediate table. When the next record is in the table, processing goes to step S19-6. If the next record is not in the table, the processing goes to step S19-9.

In step S19-6, an equi-join key value in the next record is obtained. In step S19-7, the obtained key value and the value stored by the present key value storing unit 18-3 are compared. When both values are equal, processing goes back to step S19-4. When both values are not equal, the processing goes to step S19-8.

In step S19-8, the join result producer 18-4 processes the record stored in the buffer by the record storing unit 18-2, and produces a result record. Then, the processing goes back to step S19-2.

In step S19-9, the join result producer 18-4 processes the record stored in the buffer by the record storing unit 18-2, and produces a result record. Then, the processing is ended. From step S19-2 to step S19-7, a record group with an equal record key value is processed.

Figure 20:
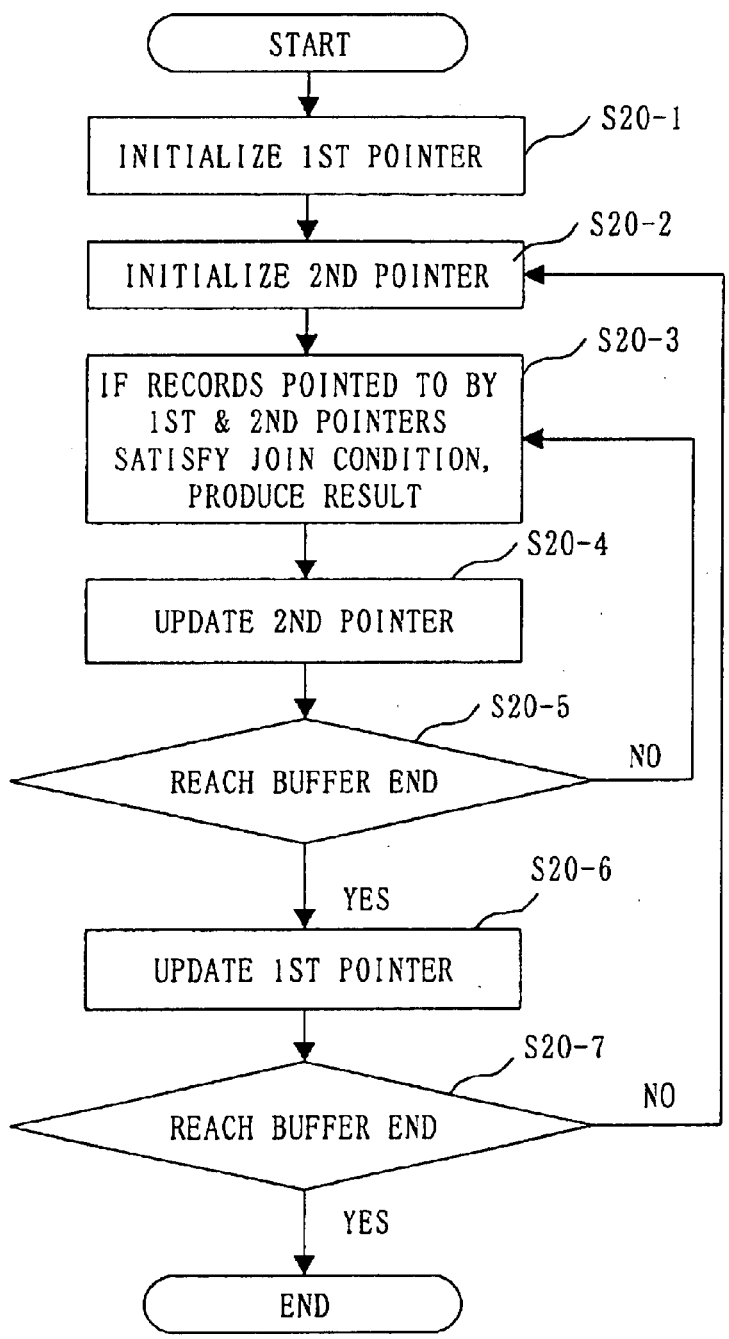
FIG. 20 shows a detailed flow chart for explaining a step in operations of the self-join operation executor according to Embodiment 1 of this invention.

FIG. 20 shows a detailed flow chart of operations of the join result producer 18-4 in FIG. 18. For simplifying explanations, an example with the multiplexing level N=2 is explained. The operations can be easily extended to a case with a general N by looping N times.

In step S20-1 of FIG. 20, a first pointer 18-51 is initialized to point to a header record in the buffer. In step S20-2, a second pointer 18-52 is initialized to point to a header record in the buffer. In step S20-3, a judgement is made if the record pointed to by the first pointer 18-51 and the record pointed to by the second pointer 18-52 satisfy the join condition. If the records satisfy the join condition, a value in a column, which is necessary for the join result, is extracted, and a result record is produced. In an example of the join condition 17-2 illustrated in FIG. 17, when two compared records have an equal "ID", and "ITEM" in the record by the first pointer is less than "ITEM" in the record by the second pointer, the result record is produced. In step S20-4, the second pointer 18-52 is advanced by one record. In step S20-5, a judgement is made if the second pointer 18-52 exceeds a last record stored in the buffer by the record storing unit 18-2. If the second pointer 18-52 does not exceed the last record, processing goes back to step S20-3. If the second pointer 18-52 exceeds the last record, the processing goes to step S20-6.

In step S20-6, the first pointer 18-51 is advanced by one record. In step S20-7, a judgement is made if the first pointer 18-51 exceeds the last record stored in the buffer by the record storing unit 18-2. If the first pointer 18-51 does not exceed the last record, processing goes back to step S20-2. If the first pointer 18-51 exceeds the last record, the processing is ended.

FIG. 21 illustrates an example of content stored in the buffer by the record storing unit 18-2. FIGS. 22(A)–22(C) illustrate a loop from step S20-2 to step S20-7.

FIG. 22(A) illustrates processing when the first pointer points to record 1. While the second pointer is advanced from record 1 to record 6, "ID" and "ITEM" in the records pointed to by the first and second pointers are compared in step S20-3. Then, a result record is produced for a record satisfying the join condition 17-2 in FIG. 17. The first pointer is advanced from record 2 to record 6, and the second pointer is advanced by one record from record 1 to record 6 in every time when the second pointer is advanced by one record. In FIG. 22(B), the second pointer is advanced from record 1 to record 6 when the first pointer is record 2. In FIG. 22(C), the second pointer is advanced from record 1 to record 6 when the first pointer is record 6. However, in FIGS. 22(A)–22(C), even if same records (record 1 and record 2) are compared, results vary depending on if the first pointer is record 1 or record 2, for example. Depending on values of "ITEM", a result record is produced in some cases, and the result record is not produced in other cases. Therefore, a following improvement is made to solve this problem.

When the join condition related to the non equi-join key is a comparison of a size, a following method can be applied. At first, before above step S20-1, records in the buffer are sorted by the non equi-join key. In initialization of the second pointer 18-52 in above step S20-2, the second pointer 18-52 is changed to point to a next record of the record pointed to by the first pointer 18-51 instead of the header record in the buffer. Accordingly, it is possible to exclude combinations which clearly does not satisfy the select condition from all combinations of the records in the buffer. Therefore, a processing speed becomes higher.

An example of a result of further sorting the records in the buffer illustrated in FIG. 23 by the non equi-join key is explained.

In FIGS. 24(A)–24(C), contents of processing where the first pointer advances from record 1 to record 6 are illustrated. However, when the first pointer is record 6, the second pointer starts from record 7. Since there is no record 7, there is no processing where the first pointer is record 6. Therefore, the first pointer advances only to record 5. By comparing FIGS. 24(A)–24(C) and FIGS. 22(A)–22(C), it is clear that a number of times of processing decreases.

As stated, according to Embodiment 1 of this invention, the self-join detector, join key classifier, and self-join operation executor are provided. Therefore, it is possible to detect a join operation or a plurality of join operations within the same column in the same table and execute the self-join operation efficiently with a small number of times of input preprocessing, reading the input record, and writing the result record.

Further, even if the join condition is not a complete equi-join, if the equi-join condition is at least partially included, the efficient equi-join processing method can be adopted.

Particularly, in processing for extracting association rules in data mining, it is possible to efficiently process a query, e.g., a query necessary for combining the records, using many self-joins by the equi-join partially.

In Embodiment 1, explanations were made on an example of the database operation processor including the self-join detector for judging if the join condition in the same column in the same table is included in the join query for combining the records satisfying a specified condition among the records in a plurality of tables stored in the storing unit, and the self-join operation executor for deriving the join operation result from one table.

Further, explanations were made on an example of the database operation processor including the preprocessor for sorting the record group in the table only by the equi-join key.

Further, explanations were made on an example of the database operation processor including the join key classifier for classifying the column in the conditional expression as one of the equi-join key or the non equi-join key by judging if each comparison term is an equal value comparison or not when the conditional expression of the query representing the join condition can be expressed as a logical multiplication (AND) of the comparison terms of the column.

Further, explanations were made on an example of the database operation processor including the preprocessor for sorting the record group in the table by the equi-join key, the record input unit for reading the record of the sorting result from the storing unit sequentially, the record storing unit for storing the record with the same equi-join key value in the buffer, the present key value storing unit for maintaining the equi-join key value of the record stored in the buffer, a plurality of pointers pointing to the records in the buffer, the join result producer for producing the self-join result by combining the records pointed to by the plurality of pointers, and the result record output unit for outputting the record produced as the self-join result to the storing unit.

Further, explanations were made on an example of the database operation processor including the preprocessor for omitting sorting when the record group in the table is sorted by the equi-join key in advance.

Further, explanations are made on an example of the database operation processor including the join result producer for sorting the records stored in the buffer by the non equi-join key when the comparison by the non equi-join key is the comparison of the size and producing the self-join result by combining the records stored in ascending order in the buffer.

Further, explanations were made on an example of the database operation processor including the self-join detector for identifying the table and column by identifiers (names) of the table and column in the query language. Embodiment 2.

Figure 25:
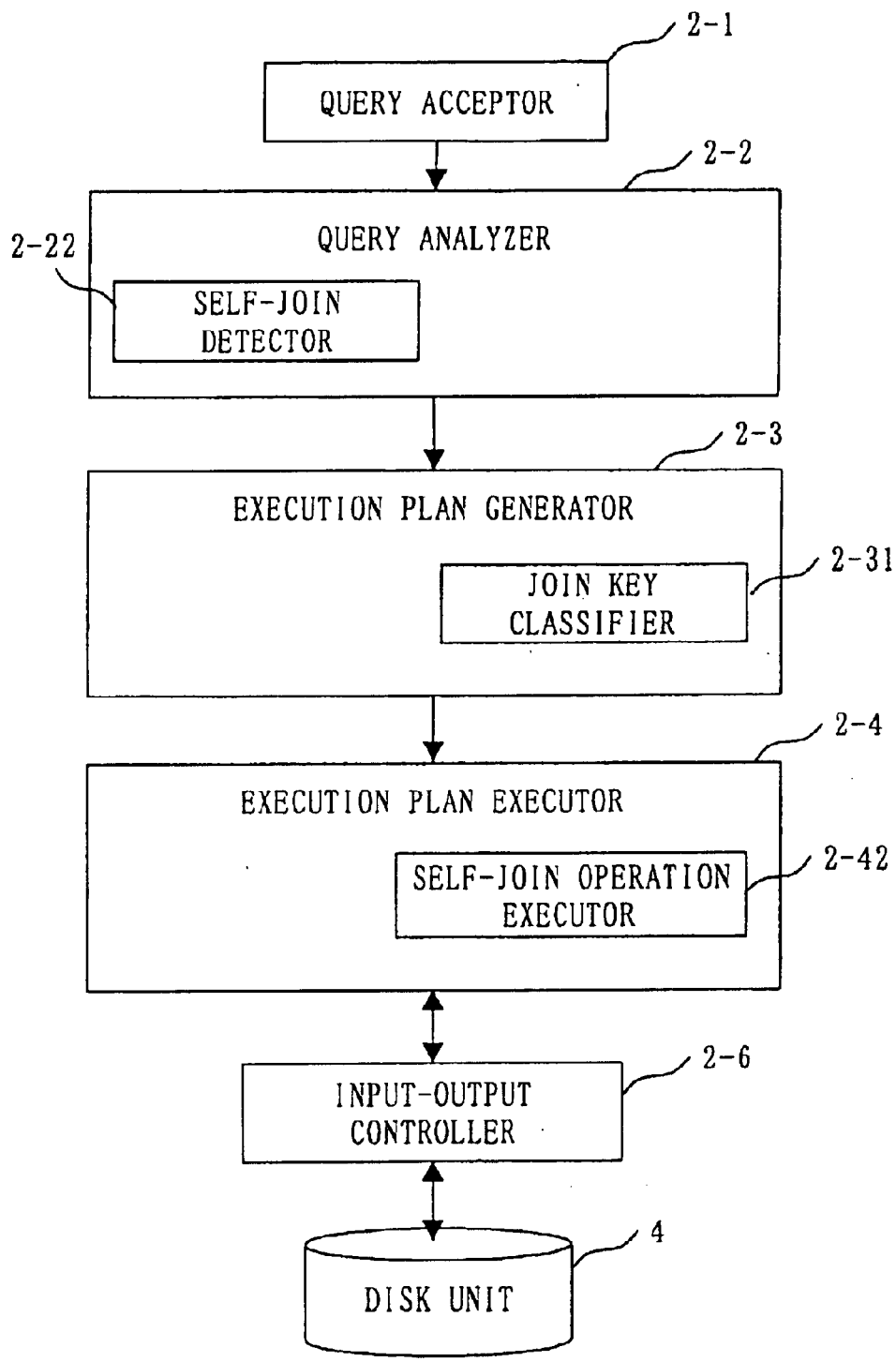
FIG. 25 shows a function block chart of a processing method of a join operation according to Embodiment 2 of this invention.

FIG. 25 shows a block chart of Embodiment 2 of this invention.

The difference between Embodiment 2 of this invention and Embodiment 1 of this invention illustrated in the block chart of FIG. 2 is that, in Embodiment 2, the query analyzer 2-2 includes a self-join detector 2-22 as illustrated in the block chart of FIG. 25.

It is possible to include a self-join operation descriptor 7-1 illustrated in FIG. 7 instead of a join operation descriptor 6-1 illustrated in FIG. 6 in the analysis result of the query output by the query analyzer 2-2 by using a special comment "—# selfjoin key" indicating self-join as illustrated in FIG. 26(B) in the query, for example.

It is also possible to include the self-join operation descriptor 7-1 illustrated in FIG. 7 instead of the join operation descriptor 6-1 illustrated in FIG. 6 in the analysis result of the query output by the query analyzer 2-2 by using a keyword indicating the self-join as illustrated in FIG. 26(C) in the query.

FIG. 26(A) is same as the query statement illustrated in FIG. 7 according to Embodiment 1. FIG. 26(A) illustrates an example of identifying the table and column by the identifiers (names) of the table and column.

As stated, since the self-join detector, join key classifier, and self-join operation executor are provided, in Embodiment 2 of this invention, the self-join operation can be executed according to a self-join instruction described in the query at high speed.

In Embodiment 2, explanations were made on an example of the database operation processor including the self-join detector for identifying the table and column by a supplementary comment added to the query language.

Further, explanations were made on an example of the database operation processor including the self-join detector for identifying the table and column by the keyword in the query language explicitly indicating the self-join. Embodiment 3.

Figure 27:
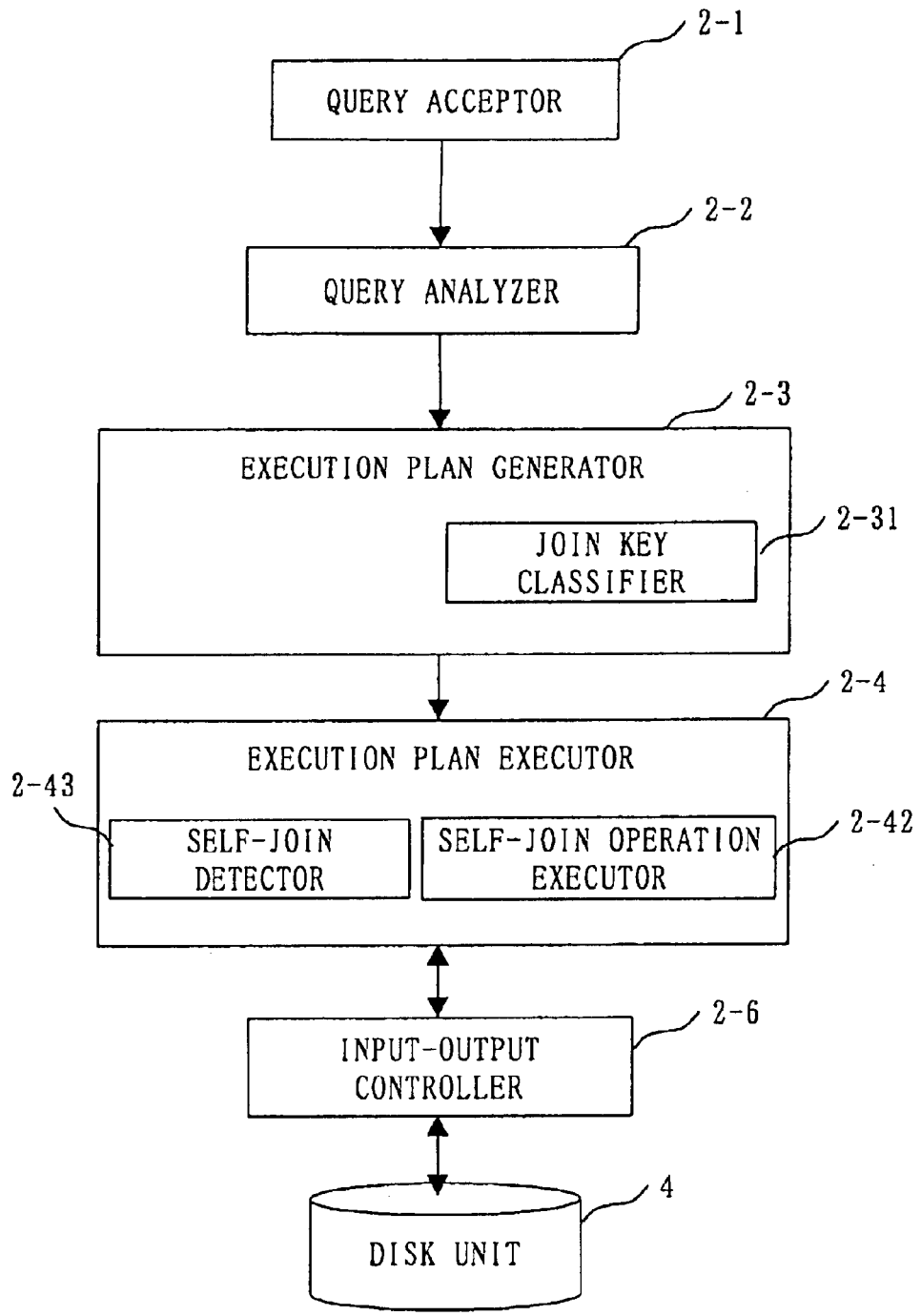
FIG. 27 shows a function block chart of a processing method of a join operation according to Embodiment 3 of this invention.

FIG. 27 shows a block chart in Embodiment 3 of this invention.

The difference between Embodiment 3 of this invention and Embodiment 1 of this invention illustrated in the block chart of FIG. 2 is that, in Embodiment 3, the execution plan executor 2-4 includes a self-join detector 2-43 as illustrated in the block chart of FIG. 27.

Two identifiers (names) of the input tables and join keys are compared before executing the join operation. If the identifiers are different, ordinary processing is performed by the join operation executor. If they are matched, the processing is performed by the self-join operation executor 2-42.

As stated, the invention in Embodiment 3 of this invention includes the self-join detector, join key classifier, and self-join operation executor. Therefore, it is possible to detect a join operation within the same column in the same table, and execute the self-join operation efficiently with less number of times of preprocessing of the input and reading the input records.

In Embodiment 3, explanations were made on an example of the database operation processor including the self-join detector for identifying the table and column by comparing the identifiers of the input table and column at a time of processing the query.

Embodiment 4.

The difference between Embodiment 4 and Embodiment 1 of this invention is that, in Embodiment 4, the preprocessor 18-7 (the preprocessor is a hash partitioning processor in Embodiment 4) in the self-join operation executor 2-42 executes hash partitioning based on a value obtained by applying a first hash function to the equi-join key instead of sorting by the equi-join key, the record input unit 18-1 processes each one of intermediate files produced by partitioning, and the record storing unit 18-2 partitions the record based on the value obtained by applying a second hash function to the equi-join key and stores in a plurality of buffers.

Figure 28:
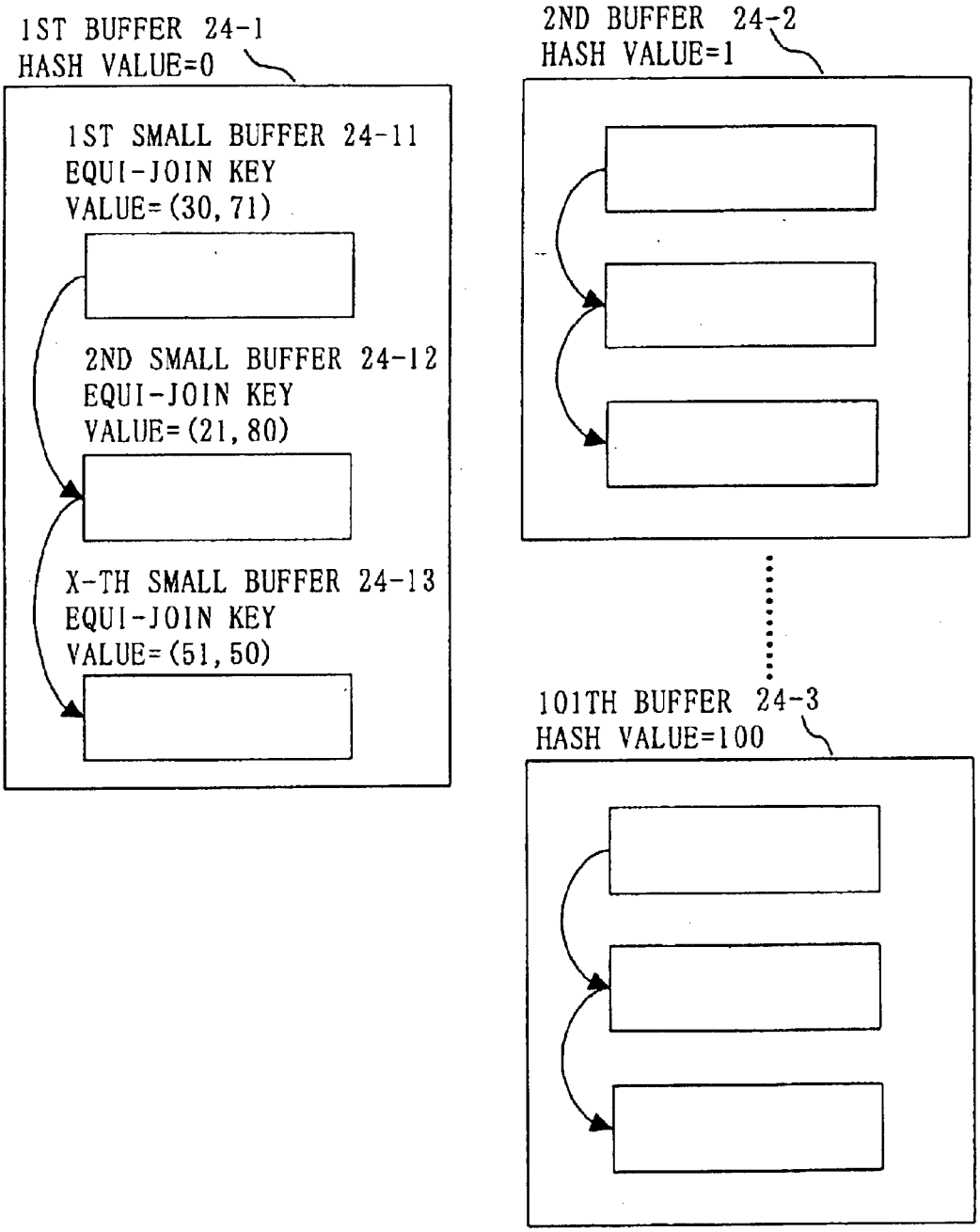
FIG. 28 shows a block chart of a record storing unit in a self-join operation executor according to Embodiment 4 of this invention.
Figure 29:
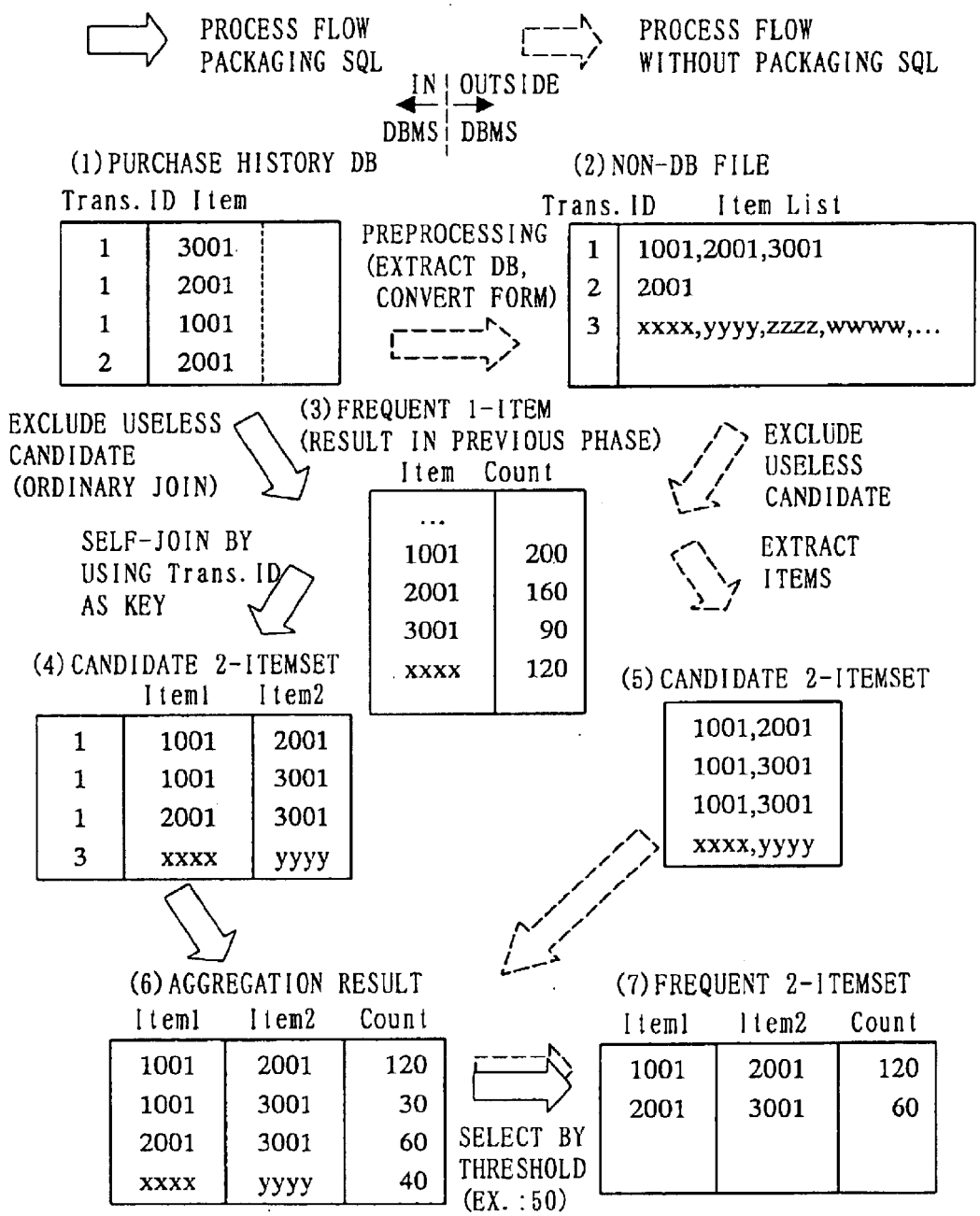
FIG. 29 shows an explanatory flow chart of association rule mining according to the related art.

FIG. 28 shows a block chart of a configuration of the record storing unit in Embodiment 4 of this invention.

For example, when the equi-join keys are key1 and key2, and the second hash function H2 is defined as H2(key1, key2)=(key1+key2) mod 101, a record, where a value of H2 is 0, is stored in a first buffer 24-1, a record, where a value of H2 is 1, is stored in a second buffer 24-2, and the records are partitioned and stored in 101 buffers till 101st buffer 24-3 based on the value of H2.

In each buffer, records with the equal hash value and various key values are mixed. Therefore, the buffer is partitioned into small buffers to store records with the equal key value in adjacent memory areas. Namely, in every time when a new record is added to the buffer, a judgement is made if there is a small buffer where the record with the same equi-join key value is stored. If there is such a small buffer, the new record is stored in the small buffer. If there is no such small buffer, a new small buffer is provided and the new record is stored in the new small buffer.

It is necessary that a range of the equi-join key value is known and density of the value is dense (no missing value) to prepare the small buffers in a necessary number in advance to store the records directly. Further, when the second hash function is not used, searching of the small buffer corresponding to the key value is inefficient.

In Embodiment 4 of this invention, the operations of the join result producer 18-4 is same as Embodiment 1 except that the processing is repeated for each small buffer. When the join condition related to the non equi-join key is the comparison of the size, the records in the small buffer are sorted by the non equi-join key to reduce a number of combinations of the records for testing the join condition as in Embodiment 1.

As stated, in Embodiment 4 of this invention, the invention includes the self-join detector, join key classifier, and self-join operation executor according to the hash processing method. Therefore, it is possible to detect the join operation within the same column in the same table, and execute the self-join operation efficiently with less number of times of preprocessing of the input and reading the input records.

In Embodiment 4, explanations were made on an example of the database operation processor including the preprocessor for executing hash partitioning of the record group in the table by using only the equi-join key when the non equi-join key is included in the join key.

Further, explanations were made on an example of the database operation processor including the preprocessor for partitioning the record group in the table into the plurality of groups based on the value obtained by applying the first hash function to the equi-join key, the record input unit for reading the records in partitioned hash groups from the storing unit sequentially, the record storing unit for partitioning the read records based on the value obtained by applying the second hash function to the equi-join key and storing in the plurality of buffers, the plurality of pointers for pointing to the records in the buffer, the join result producer for producing the self-join result by combining the records which are pointed to by the plurality of pointers in each buffer, and the result record output unit for outputting the record produced as the self-join result to the storing unit.

Further, explanations were made on an example of the database operation processor including the record storing unit for partitioning the records in the plurality of buffers by the equi-join key value and storing the partitioned records in a plurality of small buffers and the join result producer for producing the self-join result for each of the plurality of small buffers.

Further, explanations were made on an example of the database operation processor including the join result producer for sorting the record group in the plurality of small buffers by the non equi-join key when the comparison by the non equi-join key is the comparison of the size, and producing the self-join result by combining records stored in ascending order in the small buffers.

Since this invention is configured as explained, this invention has the following effect.

The database operation processor according to this invention includes the self-join detector for judging if the join condition specified in the query includes the join condition between the same columns in the same table in the join operation for combining the records in the plurality of tables, and the self-join operation executor for deriving the join operation result from the table. Therefor, the self-join operation can be processed at high speed compared with the ordinary join operation.

The self-join detector identifies the table and column by the identifier (name) of the table and column in the query language. Therefore, the self-join can be detected without changing the existing description of the query statement.

Further, the self-join detector identifies the table and column by the supplementary comment added to the query language. Therefore, the self-join can be specified by the user without changing the standard of the query language.

Further, the self-join detector identifies the table and column by the keyword in the query language explicitly indicating the self-join. Therefore, the self-join can be explicitly specified by the user.

Further, the self-join detector identifies the table and column by comparing the identifiers of the input table and column while the query is processed. Therefore, the self-join can be processed at high speed.

Further, the database operation processor according to this invention includes the join key classifier for classifying the column in the conditional expression as one of the equi-join key or the non equi-join based on if each comparison term is the equal value comparison when the conditional expression of the query representing the join condition is expressed in the logical multiplication (AND) of the comparison terms. Therefore, even if the query is not a complete equi-join, an efficient processing method as applied to the equi-join can be used.

Further, a sort processor for sorting the record group in the table by only the equi-join key among the join keys is provided. Therefor, the sort merge processing method can be applied to the query which is not the equi-join.

The join operation processing method includes the hash partitioning processor for executing hash partitioning of the record group in the table by using only the equi-join among the join keys. Therefore, even if the query is not the equi-join, the hash processing method can applied.

Further, the database operation processor according to this invention includes the sort processor for sorting the record group in the table by the equi-join key, the record storing unit for reading the records of the sort result from the storing unit sequentially and storing the records with the same equi-join key value in the buffer, the plurality of pointers for pointing to the records in the buffer, the join result producer for producing the self-join result by combining the records which are pointed to by the plurality of pointers, and the result output unit for outputting the records produced as the self-join result to the storing unit.

Further, when the record group in the table is sorted by the equi-join key in advance, the sort processing by the sort processor is omitted. Therefore, the self-join operation in the table which is sorted in advance can be executed at high speed.

The join result producer sorts the records stored in the buffer by the non equi-join key, and produces the self-join result by combining the records stored in ascending order in the buffer. Therefore, the self-join operation based on size relation can be executed at high speed.

The database operation processor of this invention includes the hash partitioning processor for partitioning the record group in the table based on the value obtained by applying the first hash function to the equi-join key into the plurality of groups, the record storing unit for reading the records in partitioned hash groups sequentially and partitioning the read records based on the value obtained by applying the second hash function to the equi-join key into the plurality of buffers, the plurality of pointers for pointing to the records in the buffer, the join result producer for producing the self-join result by combining the records which are pointed to by the plurality of pointers for each buffer, and the result output unit for outputting the records produced as the self-join result to the storing unit. Therefore, the self-join operation can be executed at high speed.

Further, the record storing unit partitions the records in the plurality of buffers based on the equi-join key value and stores the partitioned records in the plurality of small buffers, and the join result producer produces the self-join result for each of the small buffers. Therefore, the self-join operation can be executed at high speed also for data of which equi-join key values overlap.

Further, the join result producer sorts the record group in the plurality of small buffers by the non equi-join key when the comparison by the non equi-join key is the comparison of the size and produces the self-join result by combining the records stored in ascending order in the small buffers. Therefore, the self-join operation based on the size relation can be executed at high speed.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A database operation processor comprising:
a database for storing data;
a query analyzer for inputting and analyzing a query statement for the database;
an operation expression generator for generating an operation expression for executing the query statement by inputting an analysis result of the query analyzer; and
an operation expression executor for executing the operation expression generated by the operation expression generator and obtaining data satisfying the query statement from the database, wherein
the database stores a plurality of tables storing records including at least one column,
the operation expression generator includes a self-join detector for detecting join processing for joining records stored in two tables, according to a join condition, by receiving an analysis result of the query analyzer, detecting if the join processing detected is self-join operation processing where the two tables are the same and the join condition is a join condition for the same column, and generating a self-join operation expression for executing the self-join operation processing detected, and
the operation expression executor executes the self-join operation expression generated by the self-join detector and produces a result of the self-join operation processing.

2. A database operation processor comprising:
a database for storing data;
a query analyzer for inputting and analyzing a query statement for the database;
an operation expression generator for generating an operation expression for executing the query statement by inputting an analysis result of the query analyzer; and
an operation expression executor for executing the operation expression generated by the operation expression generator and obtaining data satisfying the query statement from the database, wherein
the database stores a plurality of tables storing records including at least one column, and
the operation expression executor includes a self-join detector for detecting a join operation expression for joining records stored in two tables according to a join condition, by receiving the operation expression generated by the operation expression generator, and detecting if the join operation expression detected is a self-join operation processing, when the two tables are the same and the join condition is a join condition for the same column, and a self-join operation executor for producing a result of the self-join operation processing when the self-join operation processing is detected by the self-join detector.

3. A database operation processor comprising:
a database for storing data;
a query analyzer for inputting and analyzing a query statement for the database;
an operation expression generator for generating an operation expression for executing the query statement by receiving an analysis result of the query analyzer; and
an operation expression executor for executing the operation expression generated by the operation expression generator and obtaining data satisfying the query statement from the database, wherein
the database stores a plurality of tables storing records including at least one column,
the query analyzer includes a self-join detector for inputting the query statement and analyzing join processing for joining records stored in two tables according to a join condition and further detecting if the analyzed join processing is a self-join operation processing when the two tables are the same and the join condition is a join condition for the same column, and outputting a self-join operation analysis result for instructing the operation expression generator to generate a self-join operation expression for executing the detected self-join operation processing,
the operation expression generator generates the self-join operation expression according to the self-join operation analysis result output by the self-join detector, and
the operation expression executor includes a self-join operation executor for executing the generated self-join operation expression by the operation expression generator according to the self-join operation analysis result output by the self-join detector and producing a result of the self-join operation processing.

4. The database operation processor of claim 1, wherein the database includes a column identifier for identifying the column and a table identifier for identifying the table, and the self-join detector detects the self-join operation processing by one of the analysis result of the query analyzer and the operation expression generated by the operation expression generator based on the table identifier and the column identifier.

5. The database operation processor of claim 3, wherein the query statement includes a comment for identifying the self-join operation processing, the query analyzer puts the comment in the analysis result, and the self-join detector detects the self-join operation processing by the comment.

6. The database operation processor of claim 3, wherein the query statement includes a keyword in a query language explicitly indicating the self-join operation processing, the query analyzer puts the keyword in the analysis result, and the self-join detector detects the self-join operation processing based on the keyword.

7. The database operation processor of claim 1, wherein
the self-join operation expression generated by the self-join detector includes the join condition for joining records stored in the same table, the join condition includes at least a comparison term, and when the join condition includes a plurality of comparison terms, the join condition includes a relational operator for expressing a relation between the comparison terms, the comparison terms specify at least columns included in the joining records as join keys, and include a comparison operator for expressing a relation of the join keys, the operation expression generator includes a join key classifier for detecting the join condition by inputting the self-join operation expression generated by the self-join detector, and, when all relational operators included in the detected join condition are logical multiplication (AND), classifying the column included in the comparison term as one of an equi-join key and a non equi-join key based on the comparison operator of the comparison terms included in the join condition, and the self-join operation executor includes a sort processor for sorting the records stored in the table by the equi-join key classified by the join key classifier as a sort key, inputs the table sorted by the sort processor and executes the self-join operation expression generated by the self-join detector.

8. The database operation processor of claim 7, further comprising:

a buffer for storing the records, wherein the self-join operation executor includes a record storing unit for storing records of which data of the column classified as the equi-join key by the join key classifier are equal among the records stored in the table sorted by the sort processor in the buffer, a plurality of pointers pointing to storing locations of the records stored in the buffer, a join result producer for executing the self-join operation expression by inputting a record group pointed to by the plurality of pointers from the buffer and producing the result of the self-join operation processing, and a result output unit for outputting the result produced by the join result producer.

9. The database operation processor of claim 7, wherein the self-join operation executor omits sorting of the records by the sort processor when the records stored in the table are sorted in advance by using the equi-join key as the sort key.

10. The database operation processor of claim 8, wherein the join result producer sorts the records stored in the buffer by the non equi-join key, receives the record group pointed to by the plurality of pointers from the buffer which stores the sorted records, executes the self-join operation expression, and produces the result of the self-join operation processing when the comparison operator, included in the comparison term for which the join key classified as the non equi-join key by the join key classifier is specified, is a comparison of a size.

11. The database operation processor of claim 1, wherein
the self-join operation expression generated by the self-join detector includes the join condition for joining records stored in the same table, the join condition includes at least a comparison term, and when the join condition includes a plurality of comparison terms, the join condition includes a relational operator for expressing a relation between the comparison terms, the comparison terms at least specify columns included in the joining records as join keys, and includes a comparison operator for expressing a relation of the join key, the operation expression generator includes a join key classifier for detecting the join condition by inputting the self-join operation expression generated by the self-join detector, and when all relational operators included in the detected join condition are logical multiplication (AND), classifying the column included in the comparison term as one of an equi-join key or a non equi-join key based on the comparison operator of the comparison terms included in the join condition, and the self-join operation executor includes a hash partitioning processor for partitioning the records stored in the table into a plurality of groups by applying a first hash function to the equi-join key classified by the join key classifier and storing, receives the records partitioned into the plurality of groups and stored by the hash partitioning processor, and executes the self-join operation expression generated by the self-join detector.

12. The database operation processor of claim 11, further comprising a plurality of buffers in a first buffer size for storing the records, wherein the self-join operation executor includes:

a record storing unit for applying a second hash function to the records partitioned into the plurality of groups and stored by the hash partitioning processor, partitioning the records stored in each group, and storing in the plurality of buffers a plurality of pointers pointing to storing locations of the records stored in the plurality of buffers, a join result producer for receiving the record groups pointed to by the plurality of pointers from the plurality of buffers, executing the self-join operation expression and producing a result of the self-join operation processing, and a result output unit for outputting the result produced by the join result producer.

13. The database operation processor of claim 12, wherein the record storing unit partitions the records stored in the plurality of buffers based on the data of the column classified as the equi-join by the join key classifier, and stores the records partitioned in a plurality of small buffers having a buffer size smaller than the first buffer size, and the join result producer executes the self-join operation expression for each of the plurality of small buffers and produces the result of the self-join operation processing.

14. The database operation processor of claim 13, wherein the join result producer sorts the records stored in the plurality of small buffers by the non equi-join key, executes the self-join operation expression for each of the small buffers storing the sorted records, and produces the result of the self-join operation processing when the comparison operator, included in the comparison term for which the join key classified as the non equi-join key by the join key classifier is specified, is a comparison of size.

15. The database operation processor of claim 2, wherein the database includes a column identifier for identifying the column and a table identifier for identifying the table, and the self-join detector detects the self-join operation processing by one of the analysis result of the query analyzer and the operation expression generated by the operation expression generator based on the table identifier and the column identifier.

16. The database operation processor of claim 2, wherein
the self-join operation expression generated by the self-join detector includes the join condition for joining records stored in the same table,
the join condition includes at least one comparison term, and when the join condition includes a plurality of comparison terms, the join condition includes a relational operator for expressing a relation between the comparison terms,
the comparison terms specify at least columns included in the joining records as join keys, and includes a comparison operator for expressing a relation of the join keys,
the operation expression generator includes a join key classifier for detecting the join condition by inputting the self-join operation expression generated by the self-join detector, and when all relational operators included in the detected join condition are logical multiplication (AND), classifying the column included in the comparison term as one of an equi-join key and a non equi-join key, based on the comparison operator of the comparison terms included in the join condition, and
the self-join operation executor includes a sort processor for sorting the records stored in the table by the equi-join key classified by the join key classifier as a sort key, inputs the table sorted by the sort processor, and executes the self-join operation expression generated by the self-join detector.

17. The database operation processor of claim 2, wherein
the self-join operation expression generated by the self-join detector includes the join condition for joining records stored in the same table,
the join condition includes at least one comparison term, and when the join condition includes a plurality of comparison terms, the join condition includes a relational operator for expressing a relation between the comparison terms,
the comparison terms at least specify columns included in the joining records as join keys, and include a comparison operator for expressing a relation of the join key,
the operation expression generator includes a join key classifier for detecting the join condition by inputting the self-join operation expression generated by the self-join detector, and, when all relational operators included in the detected join condition are logical multiplication (AND), classifies the column included in the comparison term as one of an equi-join key and a non equi-join key, based on the comparison operator of the comparison terms included in the join condition, and
the self-join operation executor includes a hash partitioning processor for partitioning the records stored in the table into a plurality of groups by applying a first hash function to the equi-join key classified by the join key classifier and storing, inputs the records partitioned into the plurality of groups and stored by the hash partitioning processor, and executes the self-join operation expression generated by the self-join detector.

18. The database operation processor of claim 3, wherein
the self-join operation expression generated by the self-join detector includes the join condition for joining records stored in the same table,
the join condition includes at least one comparison term, and, when the join condition includes a plurality of comparison terms, the join condition includes a relational operator for expressing a relation between the comparison terms,
the comparison terms specify at least columns included in the joining records as join keys, and includes a comparison operator for expressing a relation of the join keys,
the operation expression generator includes a join key classifier for detecting the join condition by inputting the self-join operation expression generated by the self-join detector, and, when all relational operators included in the detected join condition are logical multiplication (AND), classifying the column included in the comparison term as one of an equi-join key and a non equi-join key, based on the comparison operator of the comparison terms included in the join condition, and
the self-join operation executor includes a sort processor for sorting the records stored in the table by the equi-join key classified by the join key classifier as a sort key, inputs the table sorted by the sort processor and executes the self-join operation expression generated by the self-join detector.

19. The database operation processor of claim 3, wherein
the self-join operation expression generated by the self-join detector includes the join condition for joining records stored in the same table,
the join condition includes at least a comparison term, and when the join condition includes a plurality of comparison terms, the join condition includes a relational operator for expressing a relation between the comparison terms,
the comparison terms at least specify columns included in the joining records as join keys, and include a comparison operator for expressing a relation of the join key,
the operation expression generator includes a join key classifier for detecting the join condition by inputting the self-join operation expression generated by the self-join detector, and, when all relational operators included in the detected join condition are logical multiplication (AND), classifying the column included in the comparison term as one of an equi-join key a non equi-join key, based on the comparison operator of the comparison terms included in the join condition, and
the self-join operation executor includes a hash partitioning processor for partitioning the records stored in the table into a plurality of groups by applying a first hash function to the equi-join key classified by the join key classifier and storing, inputs the records partitioned into the plurality of groups and stored by the hash partitioning processor, and executes the self-join operation expression generated by the self-join detector.

* * * * *